(12) United States Patent
Stiles et al.

(10) Patent No.: US 6,990,121 B1
(45) Date of Patent: Jan. 24, 2006

(54) METHOD AND APPARATUS FOR SWITCHING DATA OF DIFFERENT PROTOCOLS

(75) Inventors: David Stiles, Los Gatos, CA (US); Gerald W. Neufeld, Los Altos, CA (US)

(73) Assignee: Redback, Networks, Inc., San Jose, CA (US)

( * ) Notice: Subject to any disclaimer, the term of this patent is extended or adjusted under 35 U.S.C. 154(b) by 875 days.

(21) Appl. No.: 09/823,480

(22) Filed: Mar. 30, 2001

Related U.S. Application Data

(60) Provisional application No. 60/258,760, filed on Dec. 30, 2000.

(51) Int. Cl.
*H04J 3/00* (2006.01)
(52) U.S. Cl. .................. 370/498; 370/400; 370/466; 370/907; 709/249; 709/250; 709/251; 398/45; 398/59; 398/74; 398/98
(58) Field of Classification Search ........ 370/464–469, 370/400–408, 257–258, 907, 395.5, 458, 370/463, 474; 709/249–251; 398/45, 59, 398/74, 98–99
See application file for complete search history.

(56) References Cited

U.S. PATENT DOCUMENTS

| | | | |
|---|---|---|---|
| 4,667,324 A | | 5/1987 | Graves |
| 4,736,363 A | | 4/1988 | Aubin et al. |
| 5,159,595 A | | 10/1992 | Flanagan et al. |
| 5,533,018 A | * | 7/1996 | DeJager et al. .......... 370/395.5 |
| 5,608,733 A | | 3/1997 | Vallee et al. |
| 6,181,694 B1 | * | 1/2001 | Pickett ....................... 370/353 |
| 6,205,142 B1 | | 3/2001 | Vallee |
| 6,259,699 B1 | * | 7/2001 | Opalka et al. .............. 370/398 |
| 6,320,877 B1 | * | 11/2001 | Humphrey et al. ......... 370/474 |
| 6,356,550 B1 | * | 3/2002 | Williams .................... 370/364 |
| 6,466,591 B1 | * | 10/2002 | See et al. ................... 370/535 |
| 6,603,757 B1 | * | 8/2003 | Locascio .................... 370/352 |
| 6,639,910 B1 | * | 10/2003 | Provencher et al. ........ 370/351 |
| 6,778,561 B1 | * | 8/2004 | Jha ............................. 370/537 |

OTHER PUBLICATIONS

P.K. Jha, "Bandwidth Maximization for SONET/SDH and Direct Data over Optical Networks," http://www.isoc.org/inet2000/cdproceedings/1g/1g_3.htm, pp. 1-26, Nov. 16, 2000.

* cited by examiner

*Primary Examiner*—Brian Nguyen
*Assistant Examiner*—Tri H. Phan
(74) *Attorney, Agent, or Firm*—Blakely, Sokoloff, Taylor & Zafman

(57) ABSTRACT

A method and apparatus for switching data of different protocols through a network are described. In one embodiment, a method includes receiving data from a number of interfaces. Additionally, the method includes switching the data through a first switch fabric upon determining that the data is being processed as packet data. The switching of the data through the first switch fabric includes de-encapsulating a first number of protocol headers from the packet data. The switching of the data through the first switch fabric also includes encapsulating a second number of protocol headers from the packet data. Moreover, the method includes switching the data through a second switch fabric upon determining that the data is being processed as Time Division Multiplexing (TDM) traffic.

15 Claims, 11 Drawing Sheets

| STS1-9 TDM | STS10-11 PACKETS | STS12-21 TDM | STS22-23 PACKETS | STS24-35 TDM | STS36-37 PACKETS | STS38-44 TDM | STS45-46 PACKETS | STS47-48 TDM |
|---|---|---|---|---|---|---|---|---|
| 602 | 604 | 606 | 608 | 610 | 612 | 614 | 616 | 618 |

FIG. 6

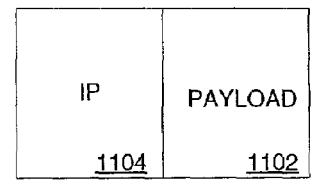
FIG. 11A  PACKET 1100
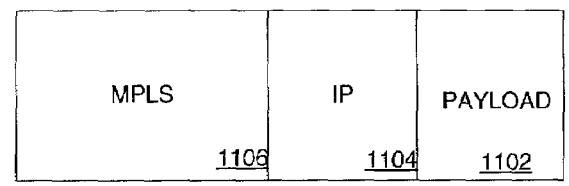
FIG. 11B  PACKET 1100
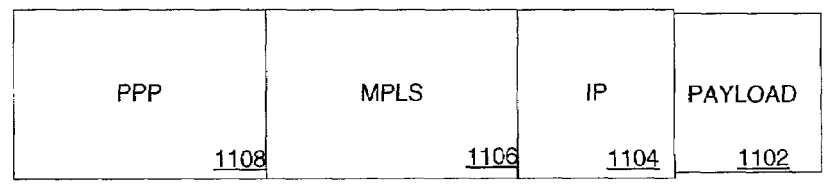
FIG. 11C  PACKET 1100
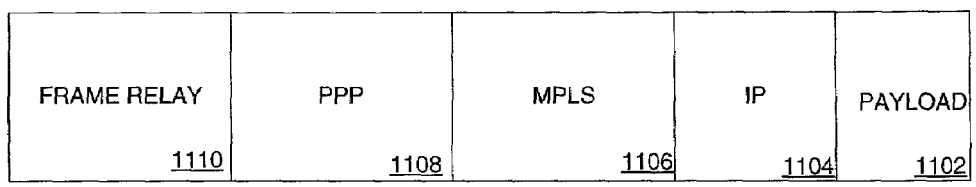
FIG. 11D  PACKET 1100
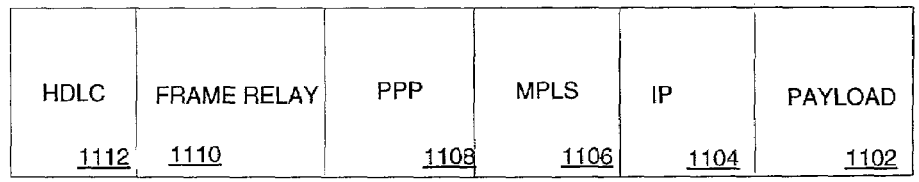
FIG. 11E  PACKET 1100

METHOD AND APPARATUS FOR SWITCHING DATA OF DIFFERENT PROTOCOLS

CROSS-REFERENCE TO RELATED APPLICATIONS

This application claims the benefit of U.S. Provisional Patent Application No. 60/258,760, entitled "A Method and Apparatus for Switching Data of Different Protocols" filed Dec. 30, 2000.

FIELD OF THE INVENTION

The invention relates to the field of telecommunications. More specifically, the invention relates to network elements that can switch data of different protocols across a network.

BACKGROUND OF THE INVENTION

With the advent of the Internet and the World Wide Web (WWW), the need for high-speed transmission of data including video and audio has continued to increase. Moreover, in addition to the demand for higher bandwidth, there has also been e an increased need for various types of services that employ different protocols. For example, certain customers (e.g., companies providing voice services) of high-speed networks want to operate on a Time Division Multiplexing (TDM) Network, which combines different data streams, such as voice traffic, such that each data stream is assigned a time slot within the combined data stream. Moreover, other customers of high-speed networks may desire to transport data employing packet-based data streams, which do not have dedicated timeslots to given packets. Examples of the types of packets that can be placed into such data streams can include Asynchronous Transfer Mode (ATM), Internet Protocol (IP), Frame Relay, voice over IP and Point-to-Point Protocol (PPP), Multi-Protocol Label Switching (MPLS) or Ethernet.

Typically, Time Division Multiplexing (TDM)-based Synchronous Optical Network (SONET) and Synchronous Digital Hierarchy (SDH) technologies can transport this packet data traffic in today's market. While traditional TDM networks can currently carrying this packet data traffic, such networks are inefficient in their usage of bandwidth. In particular, TDM networks reserve different portions of bandwidth for usage by given customers, independent of whether such customers are transporting data traffic on that bandwidth. Moreover, the service deployment of such networks remains slow. As a result, there is a migration away from TDM networks toward a packet-based network, which is more dynamic in nature. In particular, a packet-based network only employs the portion of the bandwidth needed for its transmission. In other words, there are no fixed time slots in a packet-based network. However, TDM networks still have a place in the telecommunications network, as certain customers may demand the reservation of portions of bandwidth within the network, regardless of their usage of this bandwidth. Also, TDM networks provide "harder" guarantees of bandwidth and reliability than packet networks.

Therefore, both TDM-based and packet-based networking is still needed in the field of telecommunications. Moreover, TDM-based networks can and do transport packets.

Accordingly, there is a need for network elements with the dynamic capability of adjusting to meet the different needs of customers, including those desiring a TDM data stream as well as those wanting a more efficient usage through networks employing packet streams.

SUMMARY OF THE INVENTION

A method and apparatus for switching data of different protocols through a network are described. In one embodiment, a method includes receiving data from a number of interfaces. Additionally, the method includes switching the data through a first switch fabric upon determining that the data is being processed as packet data. The switching of the data through the first switch fabric includes de-encapsulating a first number of protocol headers from the packet data. The switching of the data through the first switch fabric also includes encapsulating a second number of protocol headers from the packet data. Moreover, the method includes switching the data through a second switch fabric upon determining that the data is being processed as Time Division Multiplexing (TDM) data.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures.

IN THE DRAWINGS

Figure 1:
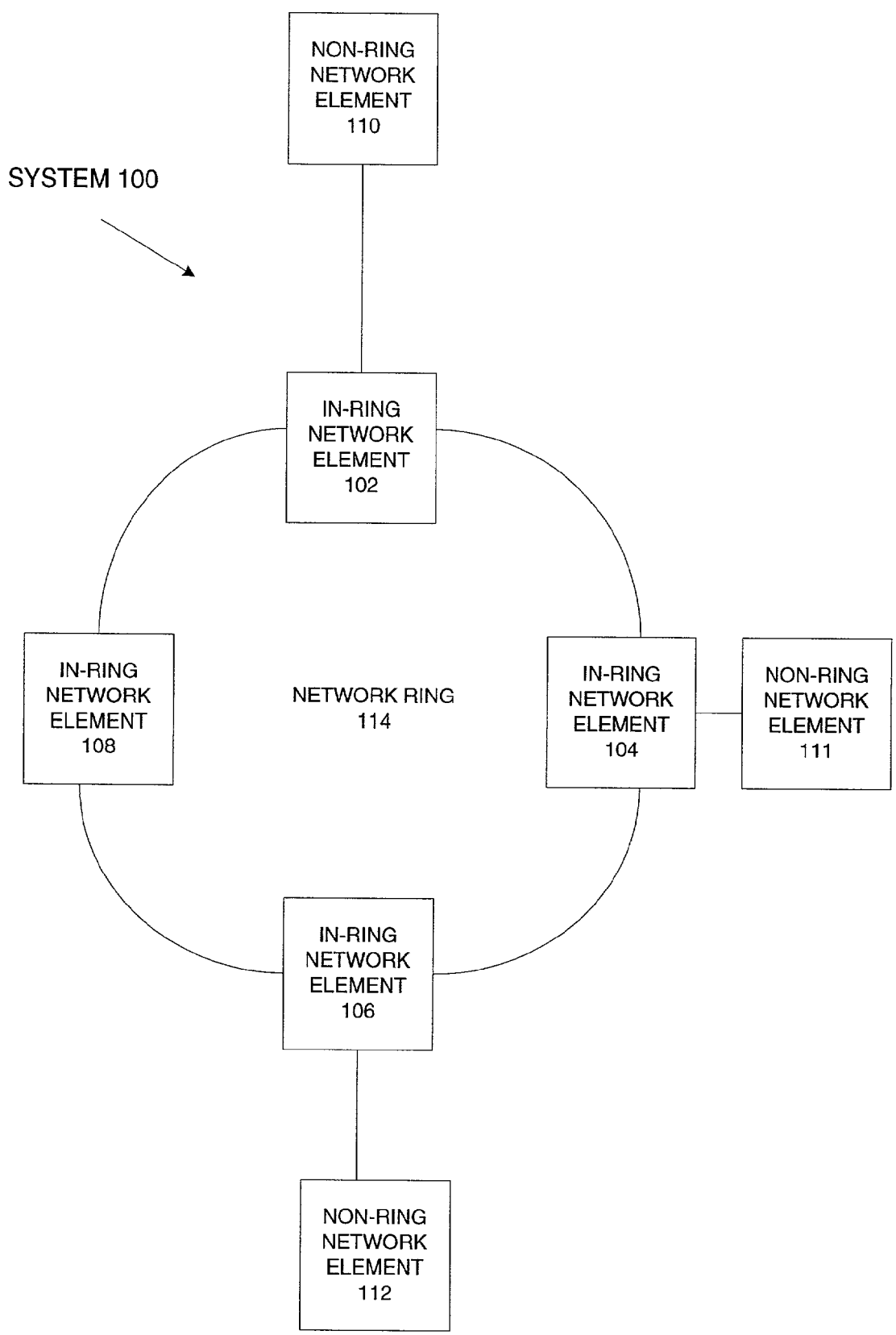
Figure 2:
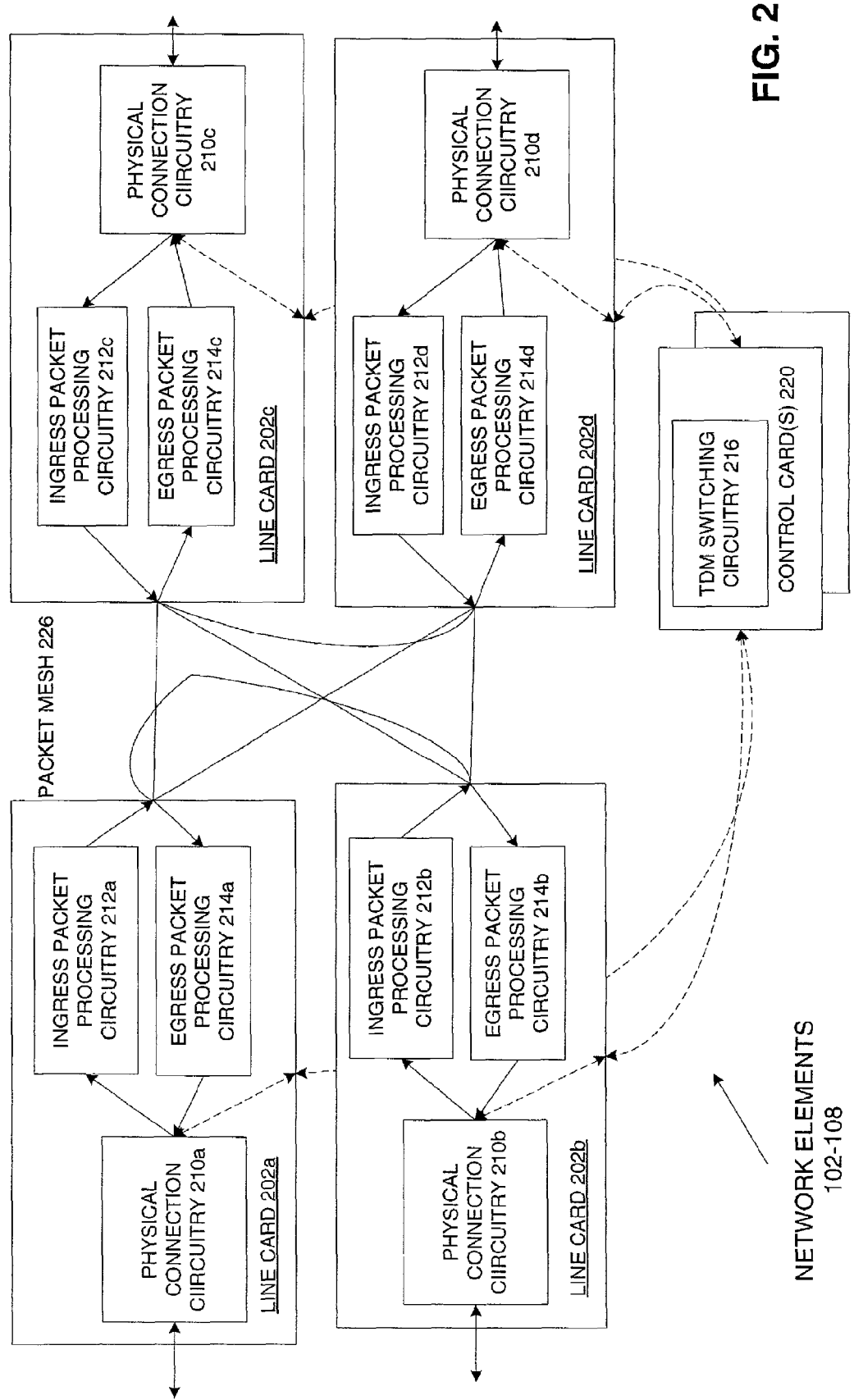
Figure 3:
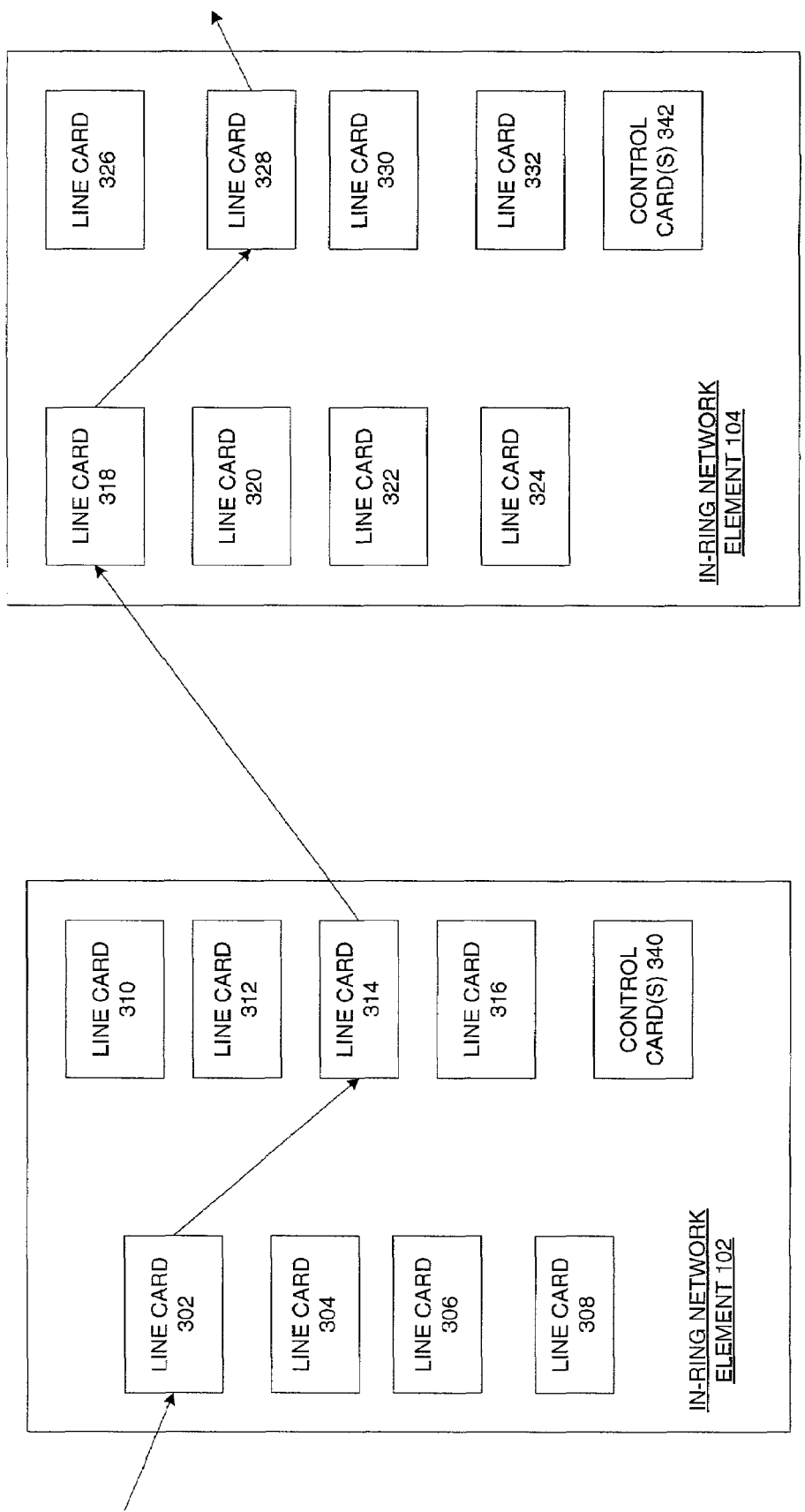
Figure 4:
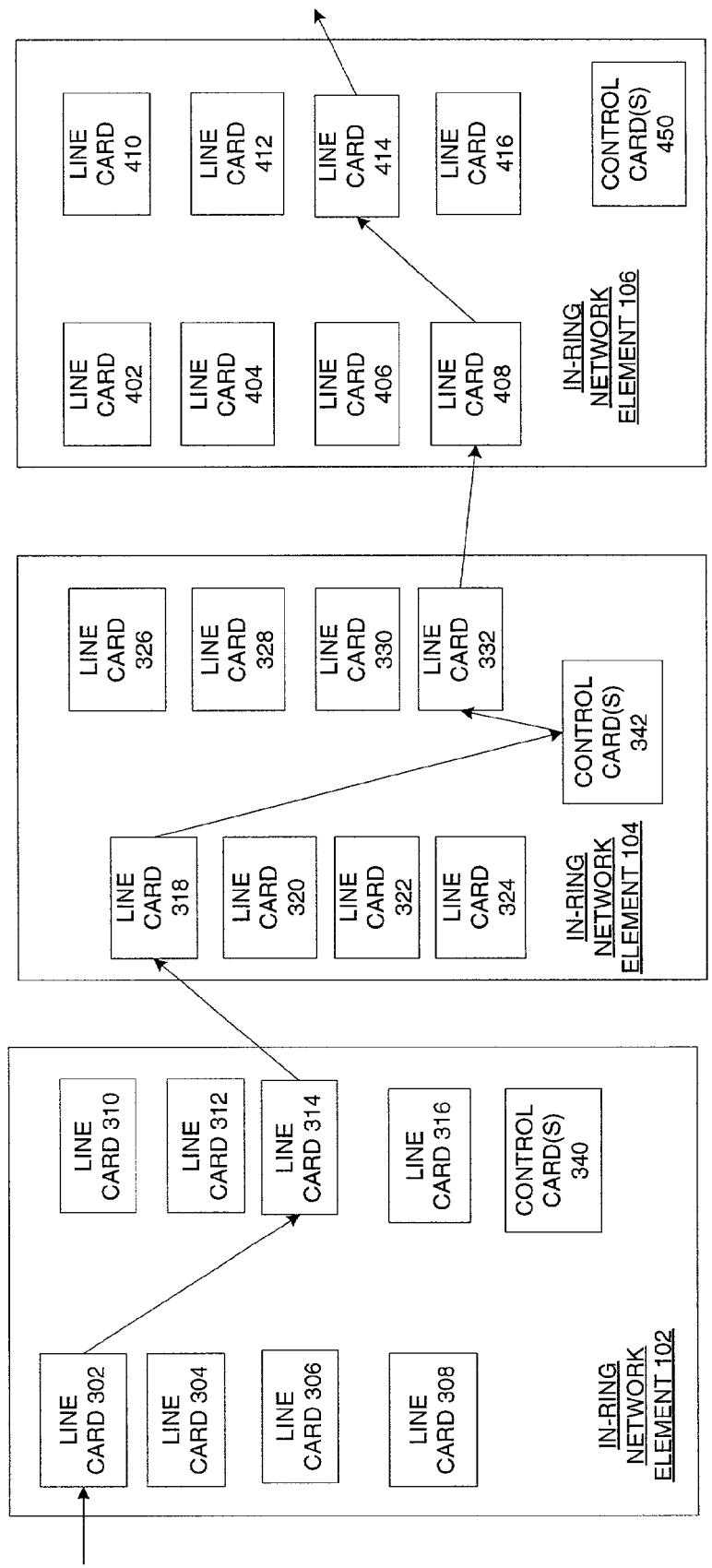
Figure 5:
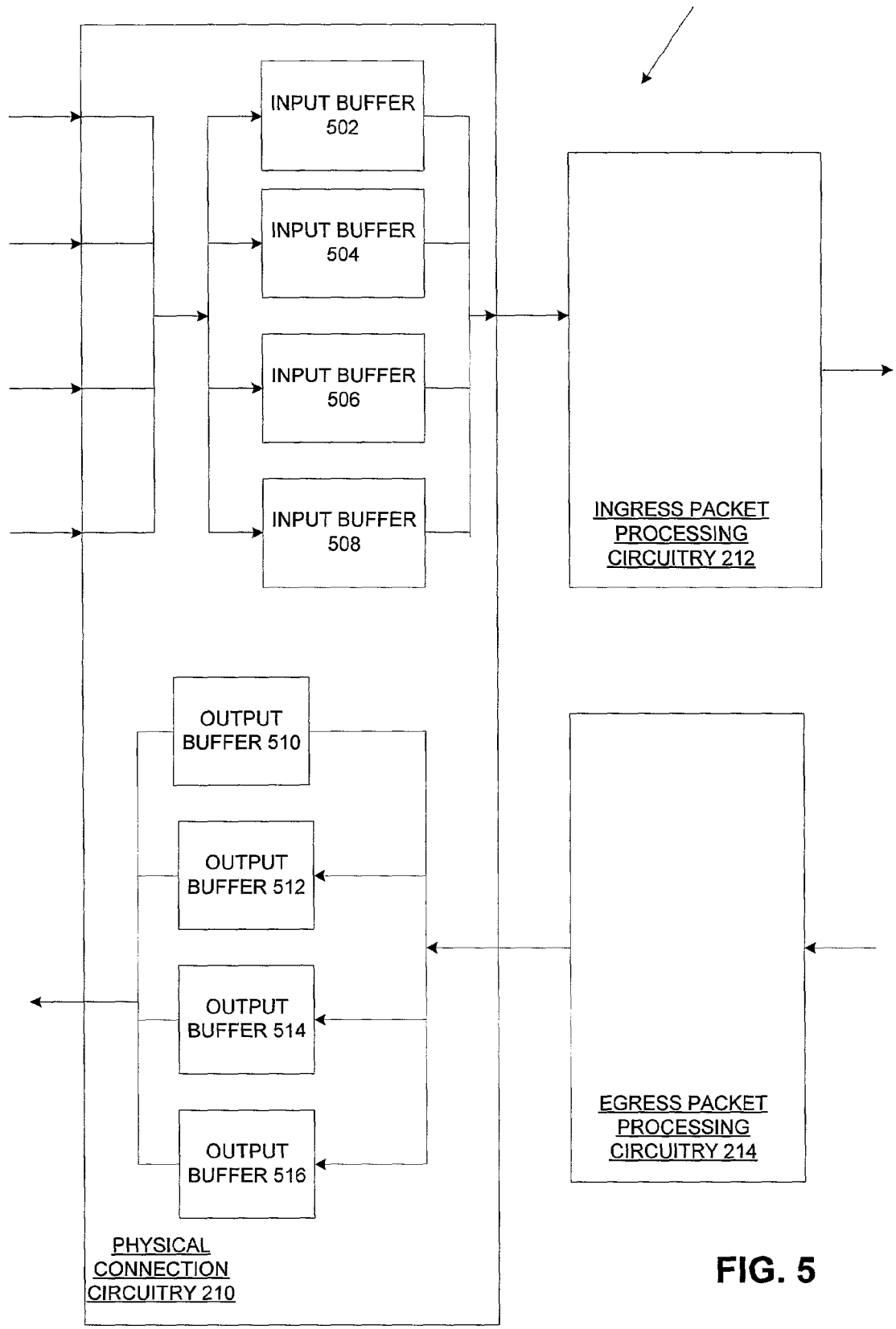
Figure 7:
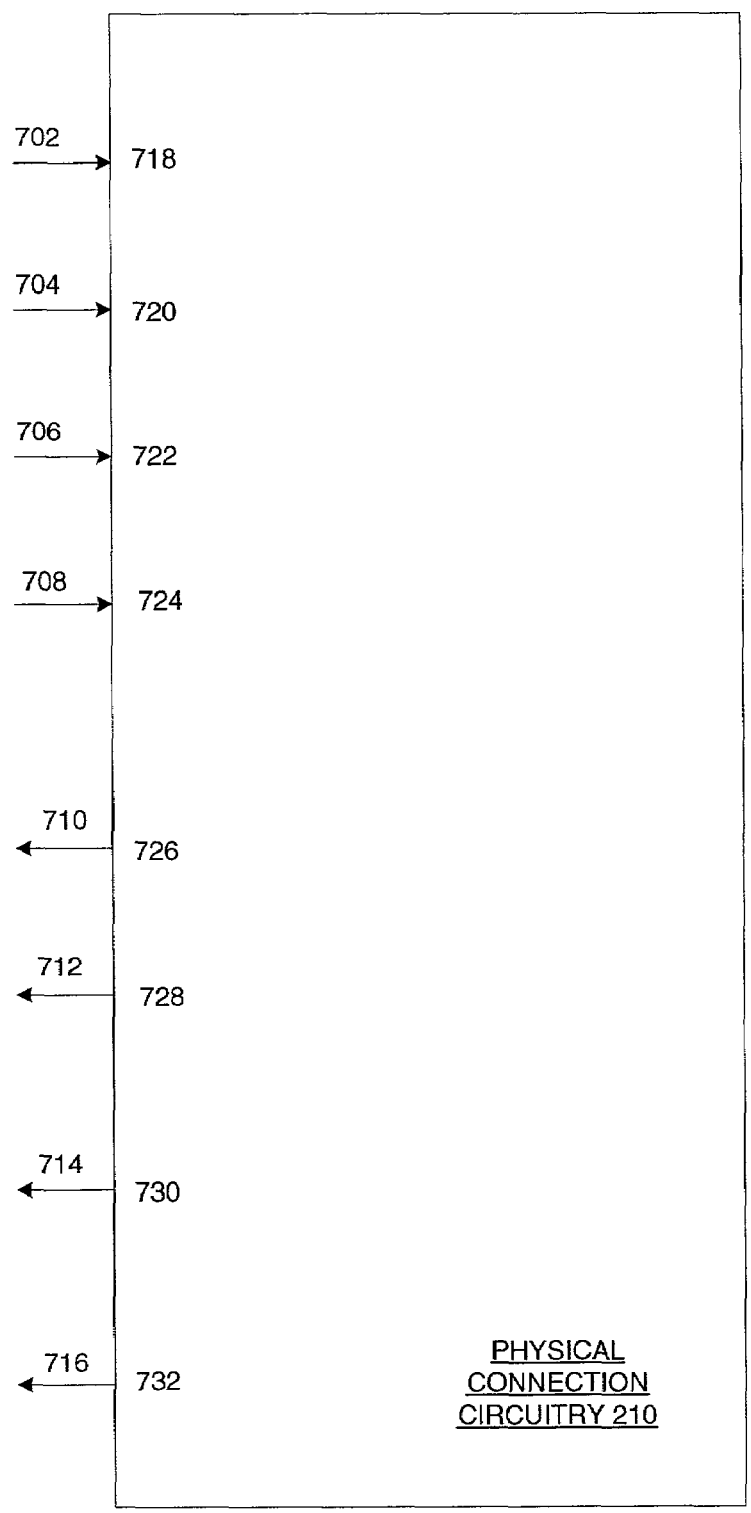
Figure 8:
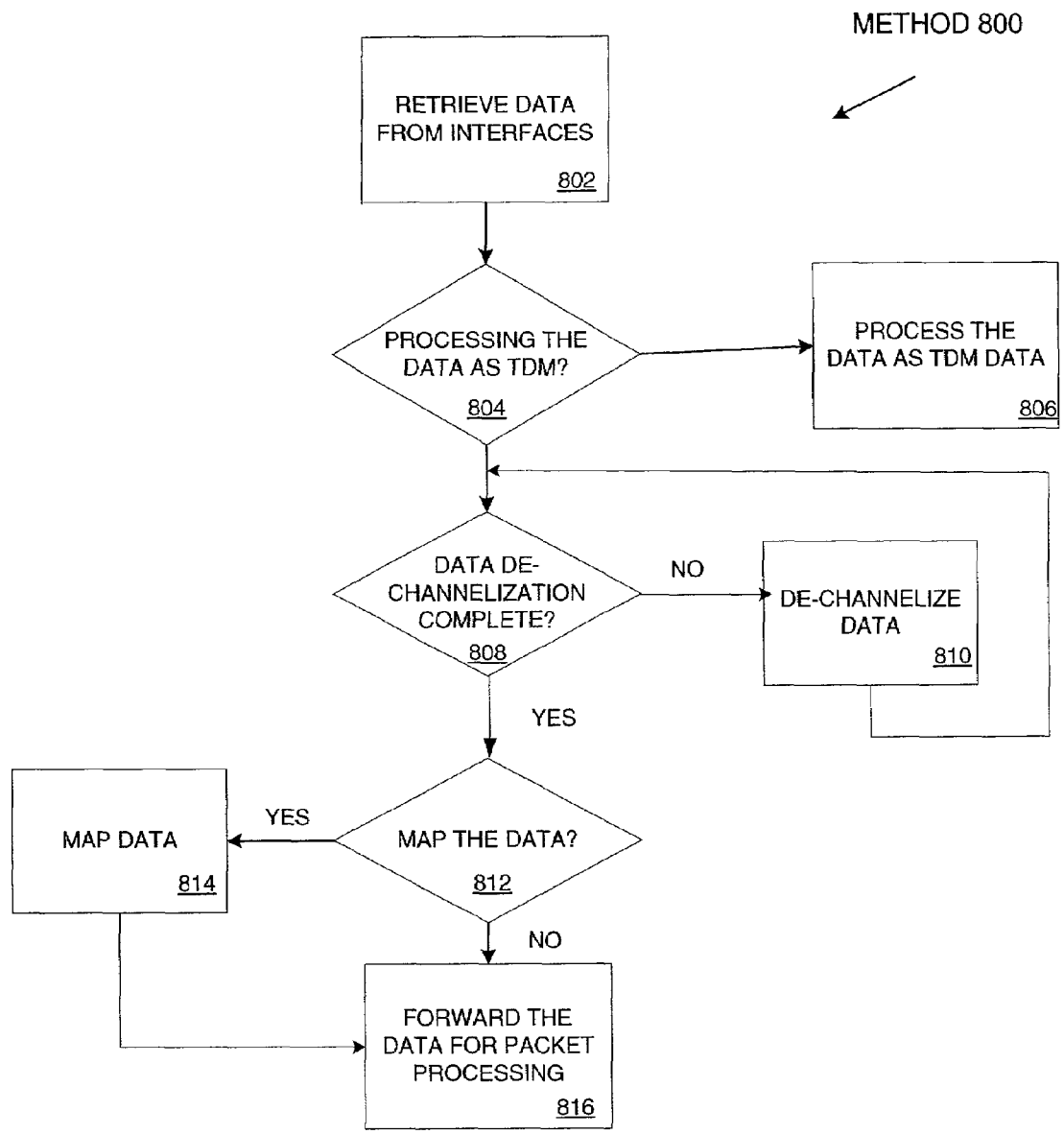
Figure 9:
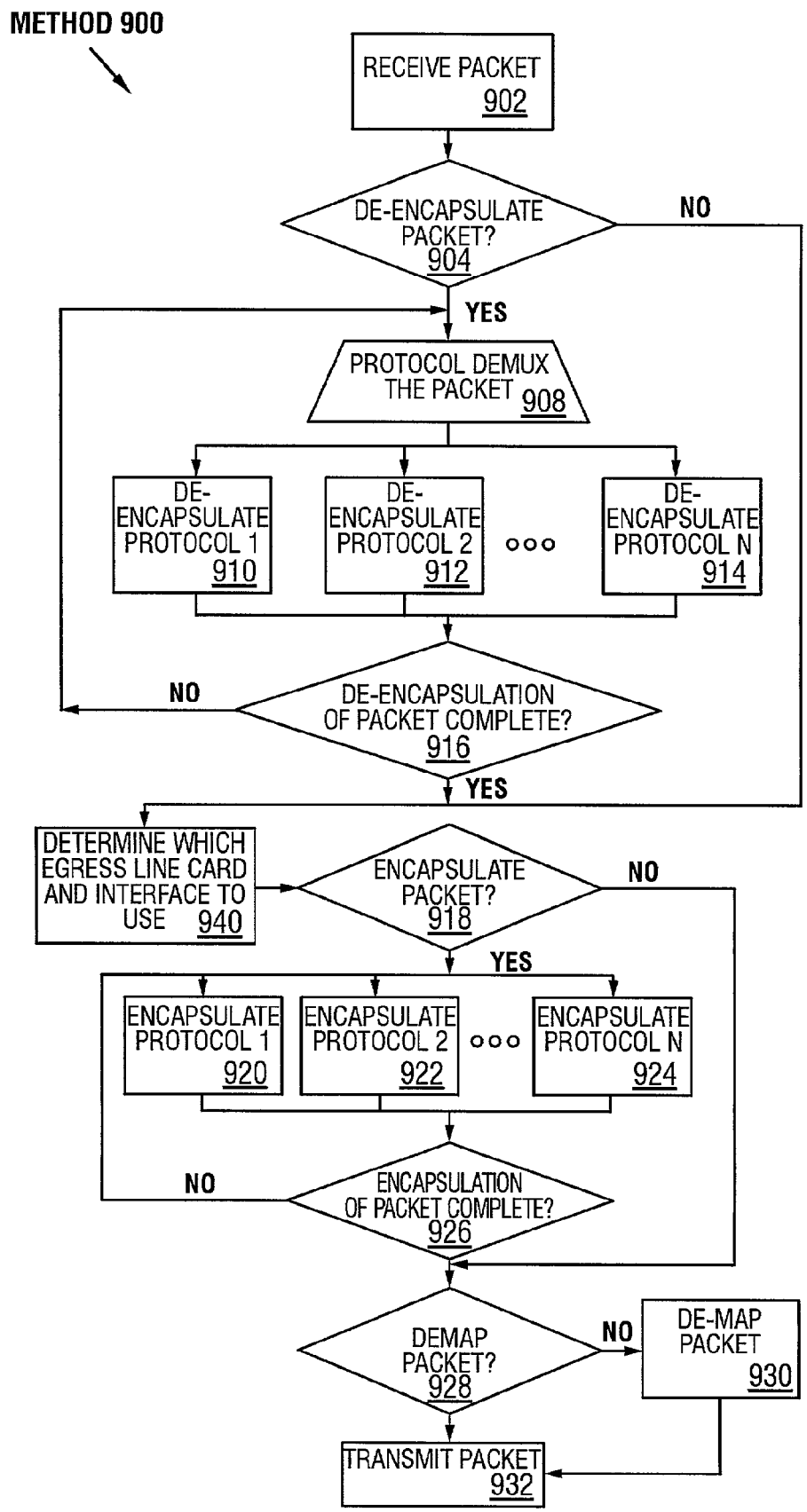
Figure 10A:
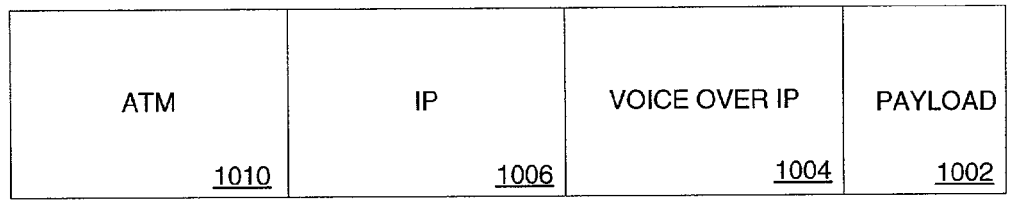
Figure 10B:
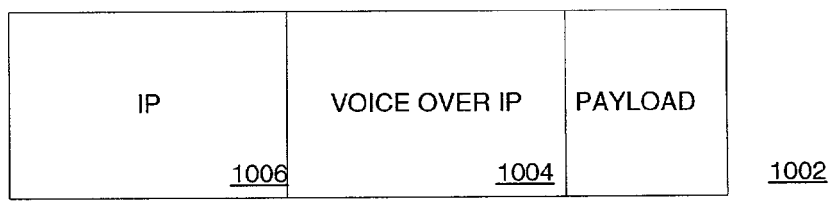
Figure 10C:
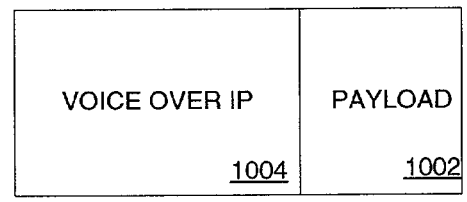

FIG. 1 is block diagram illustrating a system that incorporates embodiments of the present invention;

FIG. 2 illustrates portions of in-ring network elements 102–108, according to embodiments of the present invention;

FIG. 3 illustrates a block diagram of the relationship between two in-ring network elements for the transmission of packet traffic within network ring 114, according to embodiments of the present invention;

FIG. 4 illustrates a block diagram of the relationship among at least three in-ring network elements for the transmission of packet traffic within network ring 114, according to embodiments of the present invention;

FIG. 5 illustrates a more detailed diagram of portions of a line card within a network element, according to embodiments of the present invention;

FIG. 6 is a block diagram of a SONET signal carrying packets, according to embodiments of the present invention;

FIG. 7 illustrates the signals being received into and transmitted from physical connection circuitry 210, according to embodiments of the present invention;

FIG. 8 illustrates a flowchart for the processing of data being received and transmitted from any of line cards 202*a–d*, according to embodiments of the present invention;

FIG. 9 illustrates a flowchart for packet processing being received and transmitted from any of line cards 202*a–d*, according to embodiments of the present invention;

FIGS. 10*a*–10*c* illustrate a packet during a recursive de-encapsulation process, according to embodiments of the present invention; and FIGS. 11*a*–11*e* illustrate a packet during a recursive encapsulation process, according to embodiments of the present invention.

DETAILED DESCRIPTION

A method and apparatus for switching data of different protocols through a network are described. In the following description, for purposes of explanation, numerous specific details are set forth in order to provide a thorough understanding of the present invention. It will be evident, however, to one skilled in the art that the present invention may be practiced without these specific details.

System Description

FIG. 1 is block diagram illustrating a system that incorporates embodiments of the present invention. In particular, FIG. 1 illustrates system 100 that includes network ring 114, which is comprised of in-ring network element 102, in-ring network element 104, in-ring network element 106 and in-ring network element 108. System 100 also include non-ring network element 110, non-ring element 111 and non-ring network element 112, which are coupled to network ring 114 through in-ring network element 102, in-ring network element 104 and in-ring network element 106, respectively. In an embodiment, non-ring elements 110–112 can be routers, switches, bridges or other types of network element that switch data across a network.

In one embodiment, the connection among in-ring network element 102, in-ring network element 104, in-ring network element 106 and in-ring network element 108 allow for bi-directional traffic. Accordingly, this bi-directional capability allows for redundancy in the communication between the different network elements, such that if a given line of communication is lost, the data traffic to be transmitted thereon can be rerouted in the opposite direction to reach its intended destination within the ring architecture.

In an embodiment, system 100 transmits data traffic among the different network elements, both in-ring and non-ring, employing the Synchronous Optical Network (SONET) standard or Synchronous Digital Hierarchy (SDH). However, embodiments of the present invention are not so limited, as data traffic among the different network elements can be transferred using other types of transmission standards. Examples of other types of transmission standards can include, but are not limited to, T1, T3, Data Signal (DS)3 and DS1 signals. In one embodiment, data traffic among in-ring network element 102, in-ring network element 104, in-ring network element 106 and in-ring network element 108 includes TDM traffic and packet traffic within a same Time Division Multiplexing (TDM) signal. In an embodiment, the SONET/SDH standard is employed for in-ring communications, while a DS3 and/or DS1 standard is employed for non-ring communications.

In this ring network, network elements are used that can transmit and receive TDM ring traffic. In addition, at least certain of the network elements provide two different switching techniques—TDM and packet. The packet switching provided can support any number of protocols including layer 2 and layer 3 type protocols such as ATM, Ethernet, Frame Relay, IP and MPLS, etc. In addition to typical operations of a TDM network element, the network elements are implemented to be able to programmably select on a TDM-timeslot basis certain of the incoming TDM traffic to be extracted and packet switched rather than TDM switched. Regardless of which switching technique is used, the switched traffic going back onto the ring is put in TDM format and transmitted out. However, each time traffic is packet switched, that traffic can be statistically multiplexed.

A further description of the operation of system 100 and the network elements therein is described in more detail below.

The architecture and configuration of system 100 is by way of example and not by way of limitation, as embodiments of the present invention can be incorporated in other types of systems. For example, other such systems could incorporate less or more network elements into the network ring and/or network elements attached thereto. Moreover, embodiments of the present invention are not limited to the network ring architecture as illustrated in FIG. 1. Examples of other types of network architectures that can incorporate embodiments of the present invention include, but are not limited to, a point-to-point configuration, point-to-multipoint configuration, a hub configuration and/or different types of mesh topologies. In addition, embodiments of the present invention are not limited to TDM networks, but also applies to Wave Division Multiplexing (WDM) networks.

Network Element Description

FIG. 2 illustrates portions of in-ring network elements 102–108 (for purposes of FIG. 2, hereinafter "network element 102"), according to embodiments of the present invention. As shown, network element 102 includes line cards 202a–d and control card(s) 220, such that control card(s) 220 are coupled to each of line cards 202a–d. The number of line cards illustrated are for the sake of simplicity and not by way of limitation, as a lesser or greater number of line cards can be included within network element 102. Additionally, network element 102 includes a first switch fabric, packet mesh 226, which includes a full mesh such that each of line cards 202a–d are coupled to one another. For example, line card 202a is coupled to line cards 202b–d through packet mesh 226. However, embodiments of the present invention are not limited to a full mesh for the transmission of packets among line cards 202a–d, as any type of switching method that switches based on the addressing scheme described herein can be incorporated into embodiments of the present invention. For example, in one embodiment, line cards 202a–d could be coupled together using a switch fabric, such that the line cards are coupled to a packet switch card, which provides for the switching therein.

Line cards 202a–d include physical connection circuitry 210a–d, ingress packet processing circuitry 212a–d and egress packet processing 214a–d, respectively. Physical connection circuitry 210a–d can be coupled to lines external to network element 102, as shown, which can carry optical and/or electrical signals, which is described in more detail below in conjunction with FIG. 7. In one embodiment, line cards 202a–d of network element 102 may be connected to an optical line transmitting SONET OC-N signals. Moreover, in an embodiment, line cards 202a–d of network element 102 may be connected to an electrical line such as a T1, T3, E1, E3, Ethernet, Gigabit Ethernet, etc. However, embodiments of the present invention are not limited to the above-described examples, as any other type of optical or electrical data transmission can be incorporated into embodiments of the present invention. Additionally, control cards(s) 220 include TDM switching circuitry 216. This is by way of example and not by way of limitation, as TDM switching circuitry 216 can be placed in other locations. For example, in an embodiment, TDM switching circuitry 216 is located on a separate card, apart from control card(s) 220.

In an embodiment, each line card 202a–d can be coupled to four optical and/or electrical lines. In another embodiment, each line card 202a–d can be coupled to eight optical and/or electrical lines. However, embodiments of the present invention are not so limited, as a lesser or greater number of optical and/or electrical lines can be coupled to network element 102 through line cards 202a–d. Additionally, physical connection circuitry 210a–d are coupled to ingress packet processing circuitry 212a–d, respectively, such that packet data being received from the optical and/or electrical lines is passed from physical connection circuitry 210a–d to ingress packet processing circuitry 212a–d, respectively. In one embodiment, the packet data is extracted from a TDM signal, which is described in more detail below.

Ingress packet processing circuitry 212a–d is coupled to packet mesh 226. Accordingly, each ingress packet processing circuitry 212a–d is coupled to each egress packet processing circuitry 214a–d, respectively, on line cards 202a–d through packet mesh 226. Moreover, egress packet processing circuitry 214a–d is respectively coupled to physical connection circuitry 210a–d, such that packet data traffic coming in from packet mesh 226 from ingress packet processing circuitry 212a–d is transmitted from egress packet processing circuitry 214a–d to physical connection circuitry 210a–d, respectively.

Line cards incorporated into embodiments of the present invention are not limited to those illustrated by line cards 202a–d. Moreover, the network elements can have different line card configurations from that shown by line cards 202a–d. For example, a given in-ring network element could be limited to a single line card that can receive and transmit TDM traffic (which may include packet traffic) within network ring 114, employing multiple interfaces for the receipt and transmittal of TDM traffic. In another embodiment, a given in-ring network element can include a first line card to receive TDM traffic (which may include packet traffic) from another in-ring element, while a second line card can transmit TDM traffic to another or same in-ring network element. In one such embodiment, a third line card can be incorporated into this given in-ring network element to add, drop and transmit different types of traffic including different types of packet traffic, such as ATM, Frame Relay, IP, etc, received and transmitted to a non-ring network element. In another embodiment, a given network element may include a single line card with multiple interfaces such that a first interface receives TDM traffic from another in-ring network element, a second interface transmits TDM traffic to another in-ring network element and a third interface adds, drops and transmits traffic, such as packet traffic to a non-ring network element. A network element may be connected to multiple rings, either using multiple sets of line cards or multiple interfaces on one set of line cards.

Accordingly, a line card is used either to connect to an in-ring network element to form part of the ring, or to provide communication with out-of ring network elements. To provide some examples with regard to a line card connected with an out-of-ring network element: 1) layer 2/3 traffic from out-of-ring network element can come in, go through the packet mesh to a line card connected to an in-ring network element, and then out onto the ring being carried by a SONET frame; 2) layer 2/3 traffic coming from an out-of-ring network element can be de-mapped into SONET, go through the TDM switch fabric to a line card connected to an in-ring network element, and then out onto the ring being carried by a SONET frame; 3) TDM traffic coming from an out-of-ring network element can come in, go through the TDM switch fabric to a line card connected to an in-ring network element, and then out onto the ring being carried by a SONET frame; 4) TDM traffic coming from an out-of-ring network element carrying layer 2/3 traffic can be processed to extract the layer 2/3 traffic, with the layer 2/3 traffic going through the packet mesh to a line card connected to an in-ring network element, and then out onto the ring carried by a SONET frame; 5) layer 2/3 traffic coming from an out-of-ring network element can go through the packet mesh to a line card connected to an out-of-ring network element, and then go out of the ring being carried by the protocol of the interface of that egress line card; etc. Traffic flows can be full duplex. Accordingly, for each example, there is a corresponding in-ring to out-of-ring capability.

With regard to the TDM traffic, a second switch fabric (in addition to packet mesh 226) is formed among line cards 202a–d and TDM switching circuitry 216 of control cards 220, as illustrated by the dashed lines in FIG. 2. In particular, physical connection circuitry 210a–d is coupled to TDM switching circuitry 216 for the receiving and transmitting of TDM traffic into and out of network element 102. Accordingly, TDM switching circuitry 216 receive TDM traffic from physical connection circuitry 210a–d and switches this traffic to any of physical connection circuitry 210a–d, based on configuration data for the timeslots of the TDM traffic. For example, TDM switching circuitry 216 could be configured such that data within the first ten timeslots of a TDM signal, such as a SONET/SDH signal, received on a first interface of physical connection circuitry 210a are forwarded out the first ten timeslots of a TDM signal being transmitted out from a first interface of physical connection circuitry 210d.

Operation of Network Elements in System Embodiments

FIGS. 3 and 4 illustrate block diagrams of the relationship between a number of in-ring network elements for the transmission of packet traffic within network ring 114, according to embodiments of the present invention. FIG. 3 illustrates a block diagram of the relationship between two in-ring network elements for the transmission of packet traffic within network ring 114, according to embodiments of the present invention. In particular, FIG. 3 illustrates the traversal through two in-ring network elements prior to the transmission out from network ring 114. Conversely, FIG. 4 illustrates a block diagram of the relationship among at least three in-ring network elements for the transmission of packet traffic within network ring 114, according to embodiments of the present invention.

To help illustrate, returning to system 100 of FIG. 1, FIG. 3 illustrates an embodiment of the transporting of a packet from non-ring network element 110 to in-ring network element 102 to in-ring network element 104 and out to non-ring network element 111. In contrast, FIG. 4 illustrates an embodiment of the transporting of a packet from non-ring network element 110 to in-ring network element 102 to in-ring network element 104 to in-ring network element 106 and out to non-ring network element 112.

FIG. 3 and FIG. 4 include in-ring network element 102 and in-ring network element 104. Additionally, in-ring network element 102 includes line cards 302–316 and control card(s) 340, while in-ring network element 104 includes line cards 318–332 and control card(s) 342. FIG. 4 also includes in-ring network element 106 that includes line cards 402–416 and control card(s) 450. Moreover, FIGS. 3 and 4 include the data paths for a given packet being switched through network ring 114. However, for the sake of clarity, FIGS. 3 and 4 do not include the packet meshes or the switch fabric that couple together the different line cards and control cards within a given in-ring network element and through which the data path for the given packet is transmitted, as illustrated in FIG. 2. The operation of in-ring network elements 102–106 and the transmission of the data packet illustrated in FIGS. 3 and 4 are described in more detail below, subsequent to the description of FIGS. 5 and 6.

FIG. 5 illustrates a more detailed diagram of portions of a line card within a network element, according to embodiments of the present invention. In particular, FIG. 5 illustrates a more detailed diagram of physical connection circuitry 210, ingress packet processing circuitry 212, egress packet processing circuitry 214 and the interfaces there between, according to embodiments of the present invention. As shown, physical connection circuitry 210 includes input buffers 502–508 and output buffers 510–516. In an embodiment, input buffers 502–508 and output buffers 510–516 can be different types of writeable/readable memory (e.g., RAM). In one such embodiment, input buffers 502–508 are within a same memory. Similarly, in an embodiment, output buffers 510–516 are within a same memory. Additionally, because egress packet processing circuitry 214 is capable of receiving packet data from multiple ingress packet processing circuitry 212 of other line cards, egress packet processing circuitry 214 also includes a memory (not shown) for buffering of such packet data during their transmission to output buffers 510–516, which is described in more detail below.

Input buffers 502–508 and output buffer buffers 510–516 can be assigned to at least one of a number of Synchronous Transport Signal (STS) frames in the SONET signal transmitted inside and/or outside network ring 114. In an embodiment, this assigning (i.e., provisioning) occurs dynamically through provisioning data transmitted from control cards 220. In one such embodiment, the number of STS frames to be concatenated for a given buffer can be of any size for the SONET signal being transmitted among in-ring network elements 102–108. Moreover, in an embodiment, the STS frames that are concatenated can be located anywhere within the SONET signal.

To help illustrate, FIG. 6 is a block diagram of a SONET signal carrying TDM and packet traffic, according to embodiments of the present invention. In particular, FIG. 6 illustrates a OC-48 SONET signal, which could be transmitted among in-ring network elements 102–108. As shown, the 48 STS-1 frames (timeslots) of this OC-48 signal are apportioned into different groups. In particular, TDM traffic is located in STS1-9, STS12-21, STS24-35, STS38-44 and STS47-48 within SONET portion 602, 606, 610, 614 and 618, respectively. Accordingly, the SONET signal of FIG. 6 has STS8 worth of bandwidth not utilized by TDM traffic, thereby having holes at STS10-11, STS22-23, STS36-37 and STS45-46 therein. Therefore, packet traffic can be located within any of such holes in the SONET signal. In particular, packet traffic can be located in STS10-11, STS22-23, STS36-37 and STS45-46 within SONET portion 604, 608, 612 and 616, respectively. Input buffers 502–508 can, therefore, be assigned to one or any number of these STS frames not occupied by the TDM traffic. For example, in one embodiment, input buffer 502, input buffer 504, input buffer 506 and input buffer 508 can be assigned to STS10-11, STS22-23, STS36-37 and STS45-46, respectively. In further illustration in an embodiment, a single buffer can be assigned to all of the remaining STS frames. For example, input buffer 502 could be assigned to all of the STS frames transporting packet traffic (i.e., STS10-11, STS22-23, STS36-37 and STS45-46). The above illustrations of partitioning of timeslots between TDM and packet traffic and of the assignments of the STS frames to the different buffers are by way of example and not by way of limitation. Any size concatenation of STS frames across any of a number of locations in the SONET signal can be in any combination for assignment to input buffers 502–508 and output buffers 510–516.

Physical connection circuitry 210 receives packet data from optical and/or electrical lines coupled to input buffers 502–508. In an embodiment, the optical line and/or electrical lines coupled to physical connection circuitry 210 are transmitting packet data across a SONET-based signal. In one embodiment, this packet data is being transmitted based on TDM. In an embodiment, the optical and/or electrical lines coupled to input buffers 502–508 are transporting the packet data using the Ethernet-based standard. In one such embodiment, the packet data is transmitted within the payload of the SONET frames. Moreover, a given packet, depending on its size, may be stretched across more than one SONET frame.

Returning to FIGS. 3 and 4, upon receipt of the packet data, physical connection circuitry 210 of line card 302 places the packet data into one of input buffers 502–508. In an embodiment, physical connection circuitry 210 is programmed to place the packet data from given STS SONET frames into one of input buffers 502–508. For example, if physical connection circuitry 210 is coupled to an optical line transporting an OC-48 SONET signal, input buffer 502–508 could be assigned to receive STS1-4, STS5-11, STS-40-48 and STS-25, respectively. Accordingly, the data in the payload of these SONET frames are placed into the associated buffers.

Moreover, physical connection circuitry 210 locates the packet boundaries within the packet data located in input buffers 502–508. As described above, a given packet may be stretched across a number of STS-1 SONET frames. Accordingly, a given packet is not necessarily contained within a given STS-1 SONET frame. Therefore, physical connection circuitry 210 locates the boundaries between the packets stored in input buffers 502–508, by determining the beginning and ending of the packets within input buffers 502–508. Techniques for locating packet boundaries for different protocols are known in the art. For example, for an ATM protocol, an ATM header and payload are of fixed sizes such that the ATM header can be identified based on a unique bit combination, thereby allowing for the locating of the ATM packets.

Upon locating a packet boundary for a given packet, physical connection circuitry 210 forwards the packet to ingress packet processing circuitry 212. In an embodiment, ingress packet processing circuitry 212 can perform mapping, possible multiple de-encapsulating and/or multiple encapsulating of different protocol headers of the given packet, which is described in more detail below.

Subsequent to any demapping, de-encapsulation and/or encapsulation, ingress packet processing circuitry 212 forwards the packets to egress packet processing circuitry 214 of a different or same line card based on the address for the given packet. In particular, a table stored in memory within the given network element includes an association between a given address and one or more destination line card number(s) as well as a port number of a given buffer within physical connection circuitry 210 of each destination line card, which is described in more detail below.

Returning to FIGS. 3 and 4, to help illustrate, ingress packet processing circuitry 212 of line card 302 forwards a packet to egress packet processing circuitry 214 of line card 314 through packet mesh 226 (not shown), as illustrated by the data path between line card 302 and line card 314. Moreover, assuming that this packet is destined for output buffer 510 within line card 314, the address for this particular packet is associated with the number for line card 314 as well as the port number of output buffer 510, based on the table stored within in-ring network element 102. In an embodiment, a proprietary protocol is employed on packet mesh 226 for the transferring of packets between the different line cards. In one such embodiment, the protocol allows for the transfer of the port number of the given output buffer to which the packet is destined within the line card to which such a packet is being forwarded.

As described above, egress packet processing circuitry 214 includes a memory for the temporary storage of packets, which can be received from various ingress packet processing circuitry 212 on different line cards within a given in-ring network element. For example, egress packet processing circuitry 214 of line card 314 can receive packets from ingress packet processing circuitry 212 from any of line cards 302–316. Upon receipt of packets, in an embodiment, egress packet processing circuitry 214 can de-encapsulate and/or encapsulate the incoming packets with protocol headers, which is described in more detail below. Additionally, egress packet processing circuitry 214 forwards these packets to physical connection circuitry 210. Physical connection circuitry 210 places a given packet into a given output buffer based on the port number of the buffer associated therewith. In an embodiment, a proprietary protocol allows for the transmitting of the port number of the buffer for a given packet between egress packet processing circuitry 214 and physical connection circuitry 210.

As described above, a given output buffer can be provisioned to be associated with one to a number of SONET frames within a TDM-based SONET signal being transmitted among in-ring network elements 102–108. In one such embodiment, the number of SONET frames to be concatenated for a given output buffer can be of any size. Moreover, in an embodiment, the concatenated SONET frames can be located anywhere within the TDM-based SONET signal, as illustrated by the SONET signal of FIG. 6. Physical connection circuitry 210 places the received packets located in output buffers 510–516 into the payload of SONET frames. Additionally, physical connection circuitry 210 places such SONET frames into the timeslots within the TDM-based SONET signal that are associated with the output buffer from which the packet was extracted. For example, output buffer 510 could be associated with SONET frames OC1, OC5-10 and OC47-48 of a TDM-based SONET signal. Accordingly, packets located in output buffer 510 can be placed into any of OC1, OC5-10 and OC47-48 within the TDM-based SONET signal. Once the packet is transmitted within one of the particular timeslots in the TDM-based SONET signal, this packet can be received by physical connection circuitry 210 of the line card in the network element for which such a packet is destined.

Returning to FIGS. 3 and 4 to help illustrate, this given packet is transmitted from line card 314 of in-ring network element 102 to line card 318 of in-ring network element 104 through the TDM-based SONET signal being transported among in-ring network elements 102–108. Accordingly, this packet is received by physical connection circuitry 210 of line card 318. The subsequent transmission of the packet deviates between FIG. 3 and FIG. 4. Accordingly, the remaining transmission of the packet illustrated in FIG. 3 and FIG. 4 will now be described separately below.

With regard to the remaining transmission of the packet illustrated in FIG. 3, after receiving this given packet, physical connection circuitry 210 of line card 318 places this packet into one of input buffers 502–508, depending on which OC frames are associated with input buffers 502–508, as described above. Moreover, because this given packet may have been combined with other packet data being received at line card 314 of network element from other sources, including from non-ring network elements, physical connection circuitry 210 of line card 318 may need to relocate the packet boundaries for the packet data within input buffers 502–508, as described above. Once the packets are identified, physical connection circuitry 210 forwards these packets to ingress packet processing circuitry 212 of line card 318, as described above.

Upon receipt of packets, in an embodiment, ingress packet processing circuitry 212 can map, de-encapsulate and/or encapsulate the incoming packets with protocol headers, which is described in more detail below. Additionally, ingress packet processing circuitry 212 of line card 318 forwards the packet to egress packet processing circuitry 214 of line card 328 through packet mesh 226 (not shown), as illustrated by the data path between line card 318 and line card 328. Moreover, assuming that this packet is destined for output buffer 510 within line card 328, the address for this particular packet is associated with the number for line card 328 as well as the port number of output buffer 510, based on the address stored in the tables located within in-ring network element 104. In an embodiment, a proprietary protocol is employed on packet mesh 226 for the transferring of packets between the different line cards. In one such embodiment, the protocol allows for the transfer of the port number of the given output buffer to which the packet is destined within the line card to which such a packet is being forwarded.

Upon receipt of packets, in an embodiment, egress packet processing circuitry 214 of line card 328 can de-encapsulate and/or encapsulate the incoming packets with protocol headers, which is described in more detail below. Moreover, egress packet processing circuitry 214 of line card 328 forwards this packet to physical connection circuitry 210 of line card 328. Physical connection circuitry 210 places a given packet into a given output buffer based on the port number of the buffer associated therewith. In an embodiment, a proprietary protocol allows for the transmitting of the port number of the buffer for a given packet between egress packet processing circuitry 214 and physical connection circuitry 210.

In contrast to the transmission of a packet between in-ring network elements, this packet is being transmitted to a network element external to network ring 114. Accordingly, for those packets being transmitted external to network ring 114 on a SONET-based signal, the standards associated with the SONET protocol, including Bellcore GR-253, must be followed in order to communicate with SONET standard-based network elements. Currently, such a standard does not allow for the number of STS frames within a SONET signal to be of any size of concatenation. Moreover, such a standard does not allow such concatenated STS frames to be located anywhere within the SONET signal.

For example, under these current SONET standards, the base signal of STS-1 can be expanded to include 3 STS frames (STS-3) and multiples of four thereafter (e.g., STS-12, STS-48 and STS-192). Moreover, under the current SONET standard, a given set of STS frames are required to be equally interleaved (i.e., concatenated) within a given SONET signal. For example, if a given SONET signal includes 48 STS frames (i.e., an STS-48 signal) and only 12 of the STS frames are currently carrying data traffic (i.e., STS-12), these 12 STS frames are interleaved equally across the STS-48 signal. Accordingly, every fourth STS frame is transmitting data traffic. In other words in contrast to in-ring network elements 102–108 (network elements according to embodiments of the present invention), for those network elements that are limited to carrying data traffic based on the SONET standard, the concatenation or interleaving of a given set of STS frames could not be of any size, such as STS-11, across any location, such as the first 11 STS frames.

Therefore, for those output buffers 510–516 within physical connection circuitry 210 of line card 328 that are transmitting packets to network elements external to network ring 114 using a SONET signal, such buffers are programmed to place the packets into SONET standard-based locations within the SON-ET signal being transmitted to a non-ring network element. Returning to FIG. 3 to help illustrate, assuming that the packet transmission between in-ring network element 104 and non-ring network element 111 is SONET-based, output buffer 510 of line card 328 is associated with SONET standard-based locations within such a signal. For example, if the SONET signal is OC-12 and output buffer 510 is associated with STS-3, this packet within output buffer 510 could be placed in the concatenation of STS1, STS5 and STS9 locations.

Embodiments of the present invention were described in terms of a SONET signal being transmitted between in-ring network element 104 and non-ring network element 111. However, embodiments of the present invention are not so limited, as other types of data transmission signals can be employed. For example, if non-ring network element 111 is a router, this signal could be a packet-based stream.

Returning to FIG. 4 to describe the completion of the packet transmission therein, the given packet is located within physical connection circuitry 210 of line card 318. Describing the remaining packet transmission of FIG. 4 generally, because the packet is being routed through at least three in-ring network elements within network ring 114, this given packet may remain in possibly any location of any concatenation within the TDM data stream because the packet is being transmitted between two in-ring network elements that can process packets within these non-SONET based standard locations. Accordingly, the TDM switch fabric of certain in-ring network elements may be employed for the transmission of the packet inside network ring 114, instead of packet mesh 226 therein, as was illustrated by the transmission of the packet in FIG. 3.

In particular, this given packet that is located within at least one STS frame of the SONET signal, which is transmitted between in-ring network element 102 and 104, is transmitted through the TDM switch fabric of in-ring network element 104, as this packet remains in this STS frame of the TDM-based SONET signal between in-ring network elements 104 and 106. Physical connection circuitry 210 of line card 318, therefore, transmits this at least one STS frame containing the packet to TDM processing circuitry 216 of control card 342. Control card 220 determines which outgoing line card within in-ring network element 104 that this STS frame is destined to be transmitted through, based on forwarding tables therein.

As shown by FIG. 4, TDM processing circuitry 316 of control card(s) 342 transmits this STS frame to physical connection circuitry 210 of line card 332. In turn, physical connection circuitry 210 of line card 332 transmits this STS frame to physical connection circuitry 210 of line card 408 within in-ring network element 106. Therefore, this STS frame containing the packet is received by physical connection circuitry 210 of line card 408. Moreover, because this packet is being transmitted to a network element external to network ring 114 (i.e., non-ring network element 112), this packet will need to be extracted from the STS frame. In particular, this packet may need to be extracted from the STS frame because this STS frame may be in a set of concatenated frames of any size, which is not compliance with current SONET standards, including Bellcore GR-253. Accordingly, physical connection circuitry 210 removes the packet from the STS frame(s) and buffers this data in one of input buffers 502–508 that is assigned to the STS frame(s), as described above.

Moreover, because this given packet can be combined with other packet data being received from other sources, including from non-ring network elements, physical connection circuitry 210 of line card 408 may need to relocate the packet boundaries for the packet data within input buffers 502–508, as described above. Once the packets are identified, physical connection circuitry 210 forwards these packets to ingress packet processing circuitry 212 of line card 408, as described above.

Ingress packet processing circuitry 212 of line card 408 can de-encapsulate and/or encapsulate the incoming packets with protocol headers, which is described in more detail below. Additionally, ingress packet processing circuitry 212 of line card 408 forwards the packet to egress packet processing circuitry 214 of line card 414 through packet mesh 226 (not shown), as illustrated by the data path between line card 408 and line card 414. Moreover, assuming that this packet is destined for output buffer 510 within line card 414, the address for this particular packet is associated with the number for line card 414 as well as the port number of output buffer 510, based on the address stored in the tables located within in-ring network element 106.

Upon receipt of this packet, egress packet processing circuitry 214 of line card 414 forwards this packet to physical connection circuitry 210 of line card 414. Physical connection circuitry 210 places a given packet into a given output buffer based on the port number of the buffer associated therewith. In contrast to the transmission of a packet between in-ring network elements, this packet is being transmitted to a network element external to network ring 114. Accordingly, for those packets being transmitted external to network ring 114 on a SONET-based signal, the standards, including Bellcore GR-253, associated with the SONET protocol must be followed in order to communicate with SONET standard-based network elements. As described above, currently, such standards do not allow for the number of STS frames within a SONET signal to be of any size of concatenation. Moreover, such standards do not allow such concatenated STS frames to be located anywhere within the SONET signal.

Therefore, for those output buffers 510–516 within physical connection circuitry 210 of line card 414 that are transmitting packets to network elements external to network ring 114 using a SONET signal, such buffers are programmed to place the packets into SONET standard-based locations within the SONET signal being transmitted to a non-ring network element. This packet is transmitted to non-ring network element 112. In an embodiment wherein the in-ring network element 106 and non-ring network element 112 are communicating through a SONET signal, this packet is located within a SONET standard-based location within this SONET signal.

The embodiment of the packet transmission illustrated in FIG. 4 is by way of example and not by way of limitation, as other methods can be employed in the routing of the packet across network ring 114. In one such embodiment, the data packet transmission internal to in-ring network element 104 could be through the different packet processing circuitry and packet mesh 226. For example, if a number of concatenated STS frames within a SONET signal being transmitted between two in-ring network elements include more than one customer, the physical processing circuitry in the line cards may need to remove the packets in these concatenated frames to allow different packets to be transmitted outside network ring 114 each time this concatenated frame enters an in-ring network element.

Returning to FIG. 1 to help illustrate, assume packets from customer A are being transmitted from non-ring network element 110 to non-ring network element 112 through in-ring network elements 102–106. Assume also that packets from customer B are being transmitted from non-ring network element 110 to non-ring network element 1111 through in-ring network elements 102–104. Additionally, the packets from customer A and B share a concatenated set of STS frames in the SONET signal within network ring 114. Therefore, in each of in-ring network elements 102–106, these packets would need to be removed from the STS frames to determine whether the routing of such packets.

Accordingly, this filling of holes within the SONET signal provides a more efficient use of the bandwidth of the SONET signal. In particular, the SONET standard requires certain integer multiples of STS-1 (e.g., STS-3, STS-12 and STS-48) for the interleaving of the multiple frames within a SONET signal, which causes holes within the SONET signal to be present that cannot be filled for a given set of customers. For example, if STS-2 worth of bandwidth remained in a given SONET signal and the minimum for a given customer is STS-3, this bandwidth is wasted. However, as shown, embodiments of the present invention fill the holes in the SONET signal with any size and location of packets.

Operation of Physical Connection Circuitry 210

FIG. 7 illustrates the signals being received into and transmitted from physical connection circuitry 210, according to embodiments of the present invention. As shown, in an embodiment, physical connection circuitry 210 includes incoming signal 702 at interface 718, incoming signal 704 at interface 720, incoming signal 706 at interface 722, incoming signal 708 at interface 724. Additionally, physical connection circuitry 210 includes outgoing signal 710 at interface 726, outgoing signal 712 at interface 728, outgoing signal 714 at interface 730 and outgoing signal 716 at interface 732. The number of signals and number of interfaces into physical connection circuitry 210, as shown in FIG. 7, are by way of example and not by way of limitation, as a lesser or greater number of signals and interfaces can be incorporated into embodiments of the present invention.

Additionally, incoming signals 702–708 and outgoing signals 710–716 can be optical and/or electrical signals. In one embodiment, incoming signals 702–708 and outgoing signals 710–716 can be SONET/SDH signals. Moreover, in another embodiment, incoming signals 702–708 and outgoing signals 710–716 can be electrical signals, such as T1, T3, E1, E3, Ethernet, Gigabit Ethernet, etc. Moreover, the different incoming signals 702–708 and outgoing signals 710–716 can carry carrying different signals. For example, incoming signals 702–704 and outgoing signals 710–712 may be SONET/SDH signals, while incoming signals 706–708 and outgoing signals 714–716 may be T3 signals.

Certain operations of physical connection circuitry 210 will now be described in conjunction with the flowchart of FIG. 8. FIG. 8 illustrates a flowchart for the processing of data traffic being received into and transmitted out from any of line cards 202a–d, according to embodiments of the present invention. As described above, data being processed by line cards 202a–d can include both packet traffic and TDM traffic, such that different switch fabrics within network element 102 switch the packet traffic and the TDM traffic. Method 800 of FIG. 8 commences with the retrieval of data from one of a number of interfaces coupled to physical connection circuitry 210, such as any of interfaces 718–724, at process block 802.

Upon receipt of the data from one of the number of interfaces, physical connection circuitry 210 determines whether the data being received is to be processed as TDM or as packets, at process decision block 804. In an embodiment, this decision of how to process the data is based on configuration data received by control card(s) 220. In one such embodiment, this configuration data is received from a system administrator that provides this configuration data through a user interface, such as a software application executing on a computer, coupled to network element 102. However, embodiments of the present invention are not so limited, as other mechanisms can be employed for determining how to process the data received for a given interface. For example, in one embodiment, the configuration data could be received as transmission data from another network element, such as network element 104, coupled to network element 102. Moreover, in another embodiment, this configuration data could be transmission data received from another network element in combination with data received from a system administrator providing this data locally through a user interface coupled to network element 102.

In one embodiment, a given interface that provides packet traffic is associated with a given protocol, such as ATM, Frame Relay, IP, voice over IP, etc. Returning to FIG. 7 to help illustrate, interfaces 718 and 726 could be configured to process data having an ATM protocol, while interfaces 720 and 728 could be configured to process data having a Frame Relay protocol. Additionally, interfaces 722 and 730 could be configured to process data having the IP protocol, while interfaces 724 and 732 could be configured to process data having the voice over IP protocol.

However, embodiments of the present invention are not so limited. For example, in one embodiment, a given interface receives a T1 signal that includes a number of channels, such that each channel can be associated with a different protocol and/or different configuration for a given protocol, which is described in more detail in a patent application titled "Method and Apparatus for Processing of Multiple Protocol within Data Transmission Signals" to Ramesh Duvvuru, Felix Chow, Ricky See, Sharath Narahara and David Stiles filed on Dec. 30, 2000, Ser. No. 09/751,255, which is hereby incorporated by reference. Accordingly, a given interface is not associated with only one protocol and/or protocol configuration, as each channel within the incoming signal may include a different protocol and/or different protocol configuration.

If physical connection circuitry 210 determines that the data being received on a given interface is to be processed as TDM data, physical connection circuitry 210 processes the data accordingly. In one embodiment, this processing of the data as TDM data includes locating the Synchronous Transport Signal (STS) frames within the data. Additionally, physical connection circuitry 210 forwards these STS frames to control card(s) 220 for switching. In particular, control card(s) 220 include a table to determine which of line cards 202*a–d* are to receive the data being received from physical connection circuitry 210 of one of line cards 202*a–d*. TDM switching circuitry 216 of control card(s) 220 forwards the STS frames to the physical connection circuitry 210 of the appropriate line card. For example, in one embodiment, the STS frames received on interface 718 of line card 202*a* is transmitted out of interface 728 of line card 202*d* based on the table stored in control card(s) 220. In other words, the payload of the TDM traffic is not considered during the TDM switching.

The transmission of this TDM traffic is illustrated in terms of a control card that switches the different traffic based on a table stored therein. This is by way of example and not by way of limitation, as other types of switching mechanism can be incorporated into embodiments of the present invention. For example, similar to packet mesh 226 for the packet traffic, the TDM traffic could be switched through network element 102 through a full mesh connecting line cards 202*a–d*, independent of control cards, such as control card(s) 220, performing the switching of the data among line cards 202*a–d*.

Returning to FIG. 8, if physical connection circuitry 210 determines that the data being received on a given interface is to be processed as packet data, physical connection circuitry 210 determines if the packet data is to be de-channelized, at process decision block 808. In an embodiment, wherein the packet traffic is within a TDM signal, the packets are extracted from the TDM signal, as described above. De-channelization is defined to include the segregating or breaking down of the incoming signal into smaller components, which is further described in the patent application titled "Method and Apparatus for Processing of Multiple Protocol within Data Transmission Signals" to Ramesh Duvvuru, Felix Chow, Ricky See, Sharath Narahara and David Stiles filed on Dec. 30, 2000, Ser. No. 09/751, 255.

For example, a given data signal can include a DS-3 signal, which can be de-channelized into a number of DS-1 signals. In one such embodiment, a DS-3 signal includes 28 DS-1 signals. Additionally, each of the DS-1 signals includes a number of control and data channels. These DS-1 signals can, therefore, be dechannelized into the number of control and data channels contained therein. Accordingly, a given channel may include a different protocol and/or a different configuration in comparison to other channels within a DS-3 signal. In an embodiment, each channel, therefore, can be separately transmitted to and processed by ingress packet processing circuitry 212.

Upon determining that the data is to be de-channelized, physical connection circuitry 210 de-channelizes the data, at process block 810. Physical connection circuitry 210 then re-determines whether the data needs to be further de-channelized, at process decision block 808. This recursive de-channelization process continues until physical connection circuitry 210 determines that de-channelization is complete. In one embodiment, this decision regarding de-channelization is based on the incoming signal as well as the configuration data within physical connection circuitry 210 for the given interface. For example, if the incoming signal is a DS-3 signal, this signal can be de-channelized into a number of DS-1 signals and then further de-channelized into the number of channels within the DS-1 signals, as described above. In one embodiment, that data signal may require no de-channelization. For example, the data signal could include TDM data traffic being received from a SONET signal for switching as packet traffic through packet mesh 226, which is described in more detail below. Moreover, the data signal could be an unchannelized DS-3 and/or DS-1 signal that does not require de-channelization.

Upon determining that the data de-channelization is complete, physical connection circuitry 210 determines whether to perform data mapping on the signal, at process decision block 812. Data mapping is defined to include mapping TDM traffic, such as SONET frames, into certain size packets such that the TDM traffic can be subsequently processed by the packet processing circuitry within network element 102 (e.g., ingress packet processing circuitry 212*a* or egress packet processing circuitry 214*a*). Moreover, this mapping of the TDM data into certain size packets allows such data to be "packet switched" across packet mesh 226. In an embodiment, the size of these packets that have been mapped is based on the type of TDM traffic being received. For example, if the TDM traffic to be switched through the packet processing circuitry of network element 102 is T1, in an embodiment, the size of the packets is the size of a T1 frame. In one such embodiment, the size of a T1 frame is 193 bits. However, the size of the packets are not limited to a certain size or even by the signal being received, as different size packets can be processed by the packet processing circuitry of network element 102. Additionally, in one embodiment, this decision regarding data mapping is based on the incoming signal as well as the configuration data within physical connection circuitry 210 for the given interface. As illustrated, this data mapping is different from removal of packets from the payload of the TDM signal, wherein the packets are switched. In contrast, the TDM data is broken into certain size data packets, which includes the protocol header and the payload.

Upon determining that the data being received on an incoming interface is to be mapped, physical connection circuitry 210 maps the data into certain size packets, at process block 814. Whether the data is or is not mapped based on the decision made at process decision block 812, physical connection circuitry forwards the data for further packet processing to ingress packet processing circuitry 212, at process block 816, which is described in further detail below in conjunction with FIG. 9.

The order of processing illustrated by method 800 is by way of example and not by way of limitation, as other types of ordering can be incorporated into embodiments of the present invention. For example, in another embodiment, the data mapping illustrated by process blocks 812–814 can be executed prior to the data de-channelization illustrated by process block 808–810.

Packet Processing

The packet processing of the packets received from physical connection circuitry 210 will now be described in conjunction with FIG. 9. FIG. 9 illustrates a flowchart for packet processing being received and transmitted from any of line cards 202*a–d*, according to embodiments of the present invention. In particular, FIG. 9 illustrates method 900 that includes processing that can be executed within ingress packet processing circuitry 212 and egress packet processing circuitry 214.

The following description of the de-encapsulation and encapsulation operations is described as being executed within ingress packet processing circuitry 212. However, this is by way of example and not by way of limitation, as neither the de-encapsulation operations nor the encapsulation operations are limited to be performed in a single processing element. In an embodiment, portions of the de-encapsulation operations can be performed in ingress packet processing circuitry 212, while the remaining portions of the de-encapsulations operations can be performed in egress packet processing circuitry 214. For example, if a given data packet is encapsulated with the IP protocol, which is encapsulated with the PPP protocol, which is encapsulated with the ATM protocol, ingress packet processing circuitry 212 could de-encapsulate the data packet by removing the ATM protocol and then forward the remaining portion of the data packet to egress packet processing circuitry 214, which de-encapsulates the data packet by removing the PPP and the IP protocol. Similarly, portions of the encapsulation operations can be performed in ingress packet processing circuitry 212, while the remaining portions of the encapsulation operations can be performed in egress packet processing circuitry 214.

Method 900 commences with the receipt of packets from physical connection circuitry 210 by ingress packet processing circuitry 212a, at process block 902. Ingress packet processing circuitry 212a determines whether to de-encapsulate the packets being received, at process decision block 904. De-encapsulation, which is illustrated in more detail below, includes the processing of a data packet based on the protocol header as well as the removal of the protocol header, thereby leaving the payload for the given protocol.

In one embodiment, this initial decision to de-encapsulate by ingress packet processing circuitry 212 is based on configuration data that can be stored in database tables in memory. In one embodiment, this initial decision to de-encapsulate by ingress packet processing circuitry 212 is based on the interface the packet arrived on. Similar to the configuration data that enables the decision regarding whether to process the data as TDM or as packet as described above, in an embodiment, this configuration data is based on configuration data received from a system administrator and/or another network element. In an embodiment, this configuration data is stored in a table in memory that can be either internal and/or external to ingress packet processing circuitry 212. In an embodiment, this decision is based on field within the protocol headers attached to the payload of a given packet being processed. In one embodiment, the decision can be based on both configuration data and the fields of the protocol headers.

Upon determining that the incoming packet will not be de-encapsulated, ingress packet processing circuitry 212 determines which egress line card and interface on such card to use to transmit the packet out from, at process block 940. In an embodiment, ingress packet processing circuitry 212 makes this decision based on information in layer 2/3. Additionally, ingress packet processing circuitry 212 determines whether to encapsulate the data packet, at process decision block 918, which is described in more detail below.

Upon determining that the incoming packet needs to be de-encapsulated, ingress packet processing circuitry 212 performs a protocol demultiplex of the packet, at process block 908. In particular, during the protocol demultiplex, ingress packet processing circuitry 212 receives a packet from a given interface and determines which protocol is associated with this interface based on configuration data for the given interface. Similar to the configuration data that enables the decision regarding whether to process the data as TDM or as packet as described above, in an embodiment, this configuration data is based on configuration data received from a system administrator and/or another network element. In an embodiment, this configuration data is stored in a table in memory that can be either within ingress packet processing circuitry 212 or external to ingress packet processing circuitry 212. In an embodiment, this decision is based on field within the protocol headers attached to the payload of a given packet being processed. In one embodiment, the decision can be based on both configuration data and the fields of the protocol headers.

Once the protocol is determined for the given interface, ingress packet processing circuitry 212 de-encapsulates the packet based on this protocol, at one of process blocks 910–914. In particular, process blocks 910–914 illustrate that one or more protocols can be processed by ingress packet processing circuitry 212. The types of protocols that can be processed by ingress packet processing circuitry 212 include, but are not limited to, ATM, Frame Relay, voice over IP, IP, PPP, MultiProtocol Label Switching (MPLS) and Ethernet. Therefore, process block 910 could handle ATM protocols; process block 912 could handle Frame Relay protocols; process block 914 could handle voice over IP protocols, etc.

In one embodiment, portions of ingress packet processing circuitry 212 can be programmed using an object-oriented language, such that each de-encapsulation operation for a given protocol is within a class, as is known in the art. Accordingly, for a given packet being received for a given protocol that is to be de-encapsulated, a class for that protocol is instantiated to create a protocol object with configuration data for the given interface and given protocol. For example, if ingress packet processing circuitry 212 determines that an ATM protocol is to be de-encapsulated for a given packet, ingress packet processing circuitry 212 instantiates an ATM protocol object based off an ATM protocol class with configuration specific for that given interface. Such configuration may include, for example, whether the data is to be scrambled and, if so, the type of scrambling employed for this ATM protocol.

Once ingress packet processing circuitry 212 de-encapsulates a given protocol, such as ATM through for example process block 910, ingress packet processing circuitry 212 determines whether the de-encapsulation of the packet data is complete, at process decision block 916. If this given packet data is to be further de-encapsulated from a different and/or same protocol, ingress packet processing circuitry 212 performs a protocol demultiplex of the packet, at process block 908.

In one embodiment, the decision to further de-encapsulate is based on configuration data stored in memory for accessing by ingress packet processing circuitry 212. However, embodiments of the present invention are not so limited. In another embodiment, configuration data can be retrieved based on a previous protocol header that has been de-encapsulated. For example, in one embodiment the MPLS protocol header indicates the type of data, such as IP packets, being carried therein. Specifically, in an embodiment, each MPLS label is associated with a given type of traffic being carried. Accordingly, the configuration data for a given de-encapsulation (e.g., IP protocol header) may be retrieved from a previously de-encapsulated header (MPLS protocol header). This amount of de-encapsulation during this recursive de-encapsulation process, at process blocks 908–914, is, therefore, based on configuration data stored in memory and/or configuration data that is stored in previously de-encapsulated protocol headers. Moreover, in an embodiment, this recursive de-encapsulation process does not necessarily extract every protocol header from the packet, as some protocol headers are removed while other remain, all dependent on the configuration data.

To help clarify, FIGS. 10a–10c illustrate a packet during a recursive de-encapsulation process, according to embodiments of the present invention. In particular, FIGS. 10a–10c illustrate packet 1000 that can include payload 1002, voice over IP protocol header 1004, IP protocol header 1006, and ATM protocol header 1010. As shown, payload 1002 is encapsulated with voice over IP protocol 1004, which is encapsulated by IP protocol 1006, which is encapsulated by ATM protocol header 1010.

Ingress packet processing circuitry 212 receives packet 1000 shown in FIG. 10a, at process block 902. Ingress packet processing circuitry 212 makes the decision to de-encapsulate based on configuration data stored in memory, at process decision block 904. Upon determining to de-encapsulate, ingress packet processing circuitry 212 performs a protocol demultiplex of packet data 1000 to determine the type of protocol based on the interface, at process block 908. Ingress packet processing circuitry 212 determines that packet 1000 is encapsulated with an ATM protocol and de-encapsulates the ATM protocol, at one of process blocks 910–914, resulting in packet 1000 illustrated in FIG. 10b.

Ingress packet processing circuitry 212 then determines whether de-encapsulation of packet 1000 is complete based on configuration data for this given interface, at process decision block 916. Based on the configuration data from memory as well as from ATM protocol header 1010, ingress packet processing circuitry 212 determines to continue de-encapsulating as well as the protocol header to be de-encapsulated. In this example, IP protocol header 1006 is the next protocol header to be de-encapsulated. Ingress packet processing circuitry 212 de-encapsulates IP protocol header 1006, at one of process blocks 910–914, resulting in packet 1000 illustrated in FIG. 10c. Ingress packet processing circuitry 212 then determines whether de-encapsulation of the packet data is complete based on configuration data for this given interface, at process decision block 916. In this example, the configuration data dictates that the de-encapsulation is complete, thereby leaving payload 1002 encapsulated with voice over IP protocol header 1004.

As illustrated, this recursive de-encapsulation process is governed by configuration data received from memory as well as from previously de-encapsulated protocol headers. Moreover, none, a portion or all of the protocol headers may be de-encapsulated for a given packet by ingress packet processing circuitry 212.

Returning to FIG. 9, once de-encapsulation is complete at process decision block 916, ingress packet processing circuitry 212 determines which egress line card and interface on such card to use to transmit the packet out from, at process block 940. In an embodiment, ingress packet processing circuitry 212 makes this decision based on information in layer 2/3. Additionally, ingress packet processing circuitry 212 determines whether the packet is to be encapsulated, at process decision block 918. Encapsulation, which is illustrated in more detail below, includes the placement of a protocol header over the packet, which includes the payload and/or other protocol headers.

In one embodiment, this decision to encapsulate by ingress packet processing circuitry 212 is based on configuration data that can be stored in database tables in memory either internal and/or external to ingress packet processing circuitry 212. Similar to the configuration data that enables the decision regarding whether to process the data as TDM or as packet as described above, in an embodiment, this configuration data is based on configuration data received from a system administrator and/or another network element. In an embodiment, this configuration data is stored in a table in memory that can be either internal and/or external to ingress packet processing circuitry 212. In an embodiment, this decision is based on field within the protocol headers attached to the payload of a given packet being processed. In one embodiment, the decision can be based on both configuration data and the fields of the protocol headers. Upon determining that the incoming packet will not be encapsulated, ingress packet processing circuitry 212 makes a decision of whether to demap the packet, at process decision block 928, which is described in more detail below.

Ingress packet processing circuitry 212 encapsulates the packet with a particular protocol that is defined by configuration data, at one of process blocks 920–924. In particular, process blocks 920–924 illustrate that one to a number of protocols can be employed to encapsulate packet by ingress packet processing circuitry 212. The types of protocols that can be employed by ingress packet processing circuitry 212 include, but are not limited to, ATM, Frame Relay, voice over IP, IP, PPP, MultiProtocol Label Switching (MPLS) and Ethernet. Therefore, process block 920 could handle ATM protocols; process block 922 could handle Frame Relay protocols; process block 924 could handle voice over IP protocols, etc.

In one embodiment, portions of ingress packet processing circuitry 212 can be programmed using an object-oriented language, such that each encapsulation operation for a given protocol is within a class, as is known in the art. Accordingly, for a given packet being received for a given protocol that is to be encapsulated, a class for that protocol is instantiated to create a protocol object with configuration data for the given interface and given protocol. For example, if ingress packet processing circuitry 212 determines that a given packet is to be encapsulated with an ATM protocol, ingress packet processing circuitry 212 instantiates an ATM protocol object based off an ATM protocol class with configuration specific to the given interface from the packet is received. Such configuration may include, for example, whether the data is to be scrambled and, if so, the type of scrambling employed for this ATM protocol.

Once ingress packet processing circuitry 212 encapsulates a packet with a given protocol, such as ATM through for example process block 920, ingress packet processing circuitry 212 determines whether the encapsulation of the packet is complete, at process decision block 926. If this given packet is to be further encapsulated with a different and/or same protocol, ingress packet processing circuitry 212 encapsulates this packet again, at one of process blocks 920–924, depending on the type of protocol employed to encapsulate the packet.

To help clarify, FIGS. 11a–11e illustrate a packet during a recursive encapsulation process, according to embodiments of the present invention. In particular, FIGS. 11a–11e illustrate packet 1100 that can include payload 1102, IP protocol header 1104, MPLS protocol header 1106, PPP protocol header 1108, Frame Relay protocol header 1110, and HDLC protocol header 1112.

The packet subsequent to any de-encapsulations, for this example, is illustrated by packet 1100 as shown in FIG. 11a, which includes payload 1102 and IP protocol header 1104. Ingress packet processing circuitry 212 makes the decision to encapsulate based on configuration data, at process decision block 918. Upon determining to encapsulate, ingress packet processing circuitry 212 determines to encapsulate with a MPLS protocol, at one of process blocks 920–924, resulting in packet 1100 illustrated in FIG. 11b.

Ingress packet processing circuitry 212 then determines whether encapsulation of packet 1100 is complete based on configuration data for this given interface, at process decision block 926. Based on the configuration data, ingress packet processing circuitry 212 determines to continue encapsulating as well as the type of protocol header used to encapsulate. In this example, PPP protocol header 1108 is the next protocol header used to encapsulate packet 1100. Accordingly, ingress packet processing circuitry 212 encapsulates packet 1100 with PPP protocol header 1108, at one of process blocks 920–924, resulting in packet 1100 illustrated in FIG. 11*c*.

Ingress packet processing circuitry 212 then determines whether encapsulation of packet 1100 is complete based on configuration data for this given interface, at process decision block 926. Based on the configuration data, ingress packet processing circuitry 212 determines to continue encapsulating as well as the type of protocol header used to encapsulate. In this example, Frame Relay protocol header 1110 is the next protocol header used to encapsulate packet 1100. Accordingly, ingress packet processing circuitry 212 encapsulates packet 1100 with Frame Relay protocol header 1110, at one of process blocks 920–924, resulting in packet 1100 illustrated in FIG. 11*d*. Again, ingress packet processing circuitry 212 then determines whether encapsulation of packet 1100 is complete based on configuration data for this given interface, at process decision block 926. In this example, HDLC protocol header 1112 is the next protocol header used to encapsulate packet 1100. Accordingly, ingress packet processing circuitry 212 encapsulates packet 1100 with HDLC protocol header 1112, at one of process blocks 920–924, resulting in packet 1100 illustrated in FIG. 11*e*. In this example, the configuration data dictates that the encapsulation is complete, thereby leaving payload 1102 encapsulated with IP protocol header 1104, MPLS protocol header 1106, PPP protocol header 1108, Frame Relay protocol header 1110 and HDLC protocol header 1112.

As illustrated, in an embodiment, this recursive encapsulation process is governed by configuration data and/or protocol headers, such that a packet can be encapsulated with any number of protocol headers. The protocol headers employed during the recursive de-encapsulation and encapsulation processes illustrated in Figures and 11 are by way of example and not by way of limitation. As any combination of protocol headers can be employed in these recursive de-encapsulation and encapsulation processes. For example, in one embodiment, a packet can be encapsulated with a same type protocol header, such as MPLS, multiple times.

Returning to FIG. 9, once encapsulation is complete at process decision block 926, ingress packet processing circuitry 212 determines whether the packet is to be demapped, at process decision block 928. Demapping of data includes the placement of a packet into frames of a TDM signal, such as a SONET/SDH signal. In an embodiment, demapping is the reverse process of process block 814 of FIG. 8, whereby TDM is mapped into fixed sized packets. Accordingly, after demapping the original TDM format has been restored.

Moreover, in an embodiment, demapping is a process that occurs in the outgoing line card subsequent to the packet being switched through packet mesh 226. Returning to FIGS. 2 and 7 to help illustrate, assume that outgoing signal 710 of line card 202*d* is a SONET OC-48 signal having 48 STS-1 frames. Additionally, assume that that physical connection circuitry 210 of line card 202*d* is configured to place the packet received from interface 718 of physical connection circuitry 210 of line card 202*a* into the first STS-1 frame of outgoing signal 710. Once the packet has been switched through packet mesh 226 and into egress packet processing circuitry 214*d*, egress packet processing circuitry 214 forwards the packet to physical connection circuitry 210*d*. Accordingly, physical connection circuitry 210 of line card 202*d* demaps the packet from interface 718 into the first STS-1 frame of outgoing signal 710. Moreover, the packet can be incorporated into any size concatenation across any locations within a TDM signal as described in a patent application titled "Any Size and Location of Concatenated SONET Frames in a SONET signal" to Anurag Nigam and David Stiles, filed on Dec. 30, 2000, Ser. No. 09/751,764 which is hereby incorporated by reference.

Upon determining to demap the packet, physical connection circuitry 210 demaps the data into a TDM signal, at process block 930. Additionally, physical connection circuitry 210 transmits the packet out from the given line card, at process block 932. However, upon determining that the packet is not demapped, physical connection circuitry 210 transmits the packet out from the given line card, at process block 932. Returning to FIG. 1, in one embodiment, the packet is not demapped when the packet is being transmitted to from an in-ring network element to a non-ring network element.

The de-encapsulation and encapsulation operations, as described above, were provided by ingress packet processing circuitry 212. However, embodiments of present invention could distribute this functionality across different processing elements of different line cards. For example, in one embodiment, the de-encapsulation operations could be performed within ingress packet processing circuitry 212, while the encapsulation operations could be performed within egress packet processing circuitry 214. To further illustrate, in another embodiment, both the de-encapsulation and encapsulation operations could be performed within egress packet processing circuitry 214. According, once ingress packet processing circuitry 212 determines to forward the packet to egress packet processing circuitry 214 the address of the line card containing the given egress packet processing circuitry 214 is determined by ingress packet processing circuitry 212 and forwarded based on the address. In an embodiment, ingress packet processing circuitry 212 determines this address based on a forwarding table contained therein.

System Applications

Embodiments of the present invention can be incorporated into different system applications for different uses. For example, in one embodiment, packet mesh 226 (shown in FIG. 2) of network elements 102–108 can act as a full T1 level cross connect. In particular, as described above in conjunction with process blocks 812–814 of FIG. 8, TDM data can be mapped into packet size data that can be processed by ingress packet processing circuitry 212 and egress packet processing circuitry 214 as well as being switched through packet mesh 226. For example, in an embodiment, a number of OC-12 signals being received by network element 102 can be recursively de-channelized, at process block 810 of FIG. 8, into a number of DS-3 signals and then the number of DS-3 signals into a number of T1 signals. The number of T1 signals can then be map into packet size data at process block 814 of FIG. 8.

Moreover, these packet size data of T1 signals can then be processed as a number of packets through ingress packet processing circuitry 212 and egress packet processing circuitry 214 across a number of lines cards and through packet mesh 226 within network element 102, as described above in conjunction with FIG. 9. In an embodiment, these T1 packets are neither de-encapsulated nor en-capsulated but routed to the appropriate physical connection circuitry 210 based on the incoming interface. Accordingly, a number of T1 signals from different interfaces of different line cards can be received, combined and segregated at a T1 level switching, as each T1 that has been de-channelized can be transmitted out to a different line card within network element 102.

Returning to FIG. 2 to help illustrate, a first SONET signal could be received by line card 202*a*, such that the first SONET signal includes 10 T1 signals. Additionally, a second SONET signal could be received by line card 202*b*, such that the second SONET signal includes eight T1 signals. Based on configuration of network element 102, the first five T1 signals of the first SONET signal are to be combined with the last four T1 signals of the second SONET signal and to be transmitted out through an interface of line card 202*d*. Additionally, based on configuration of network element 102, the second five T1 signals of the first SONET signal are to be combined with the first four T1 signals of the second SONET signal and to be transmitted through an interface of line card 202*c*.

Accordingly, each of the 10 T1 signals in the first SONET signal and each of the eight T1 signals of the second SONET signal are mapped into packet size data and processed as packets through packet mesh 226. Ingress packet processing circuitry 212*a* transmits the packet size data of first five T1 signals of the first SONET signal through packet mesh 226 to egress packet processing circuitry 214*d*, which forward such data to physical connection circuitry 210*d*, which places such data into a first interface that is to be transmitted out as a SONET signal, using the de-mapping illustrated in process block 930 of FIG. 9. Ingress packet processing circuitry 212*b* transmits the packet size data of last four T1 signals of the second SONET signal through packet mesh 226 to egress packet processing circuitry 214*d*, which forward such data to physical connection circuitry 210*d*, which places such data into the same first interface that is to be transmitted out as a SONET signal, using the de-mapping illustrated in process block 930 of FIG. 9.

Moreover, ingress packet processing circuitry 212*a* transmits the packet size data of last five T1 signals of the first SONET signal through packet mesh 226 to egress packet processing circuitry 214*c*, which forward such data to physical connection circuitry 210*c*, which places such data into a first interface that is to be transmitted out as a SONET signal, using the de-mapping illustrated in process block 930 of FIG. 9. Ingress packet processing circuitry 212*b* transmits the packet size data of first four T1 signals of the second SONET signal through packet mesh 226 to egress packet processing circuitry 214*c*, which forward such data to physical connection circuitry 210*c*, which places such data into the same first interface that is to be transmitted out as a SONET signal, using the de-mapping illustrated in process block 930 of FIG. 9. As shown, embodiments of the network elements herein can act as a full T1 level cross connection using packet mesh 226.

Additionally, embodiments of the present invention are not limited to the ring configurations illustrated herein. For example, in another embodiment, the network elements described herein can be placed on the edges of networks, where there can be various protocols that need to be aggregated for transmission across the network. Accordingly, a number of T1 signals carrying voice traffic, ATM cell traffic, IP packets, Frame Relay packets, etc., can be aggregated and switched across two different switch fabrics within the network element, depending on the configuration of the network element. In particular, embodiments of the network element can switch the data as TDM traffic, independent of the payload or can extract packet traffic from the TDM signal and switch based on the packets contain therein.

The line cards and control cards included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Embodiments of the present invention were described in terms of discrete processing elements, such as physical connection circuitry 210 or ingress packet processing circuitry 212, performing certain operations. However, this is by way of example and not by way of limitation. For example, in other embodiments, the operations described herein can be incorporated into a single processing element. In other embodiments, operations in one processing element may be performed in another of the described processing elements.

In a further example, the processing of the TDM traffic and packet data were described in terms of execution by multiple line cards and multiple processing elements (e.g., ingress packet processing circuitry 212). However, embodiments of the present invention are not so limited. For example, a single line card could incorporate the processing described across multiple line cards in the network elements. Moreover, a single processing element could incorporate the processing described across multiple processing elements. To further illustrate possible modifications to embodiments of the present invention, the buffers shown within the different processing elements could be removed if the processing by the processing elements was executing at such a rate that buffers were not required to hold the received data. Moreover, in an embodiment, ingress packet processing circuitry 212 and egress packet processing circuitry 214 can perform statistical multiplexing of the packets, such that the packets are prioritized. Accordingly, if the number of packets being received being to overflow buffers within ingress packet processing circuitry 212 and egress packet processing circuitry 214, such circuitry can drop those the packets having a lesser priority in comparison to other packets being received.

Accordingly, embodiments of in-ring network elements described herein can receive a TDM signal from another in-ring network element and switch the TDM signal as TDM traffic, independent of the payload contained in the TDM traffic. Moreover, another in-ring network element can receive the same TDM signal and extract some or all of the packet traffic contained therein and switch the packet traffic across packet mesh 226. Such an in-ring network element could transmit that packet traffic to another in-ring network element through a TDM signal and/or transmit the packet traffic out to a non-ring network element through a packet-based stream, another TDM signal or other type of signal.

Thus, a method and apparatus for switching data of different protocols through a network have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
    receiving data from a number of interfaces via one or more first protocols;
    switching the data through a first switch fabric upon determining that the data is being processed as packet data to be transmitted via one or more second protocols, wherein switching the data through the first switch fabric includes:
        de-encapsulating a first number of protocol headers associated with the first protocols from the packet data; and
        encapsulating the packet data with a second number of protocol headers associated with the second protocols;
    switching the data through a second switch fabric different than the first switching fabric upon determining that the data is being processed as Time Division Multiplexing (TDM) traffic; and
    concatenating the packet data into a TDM signal, wherein the concatenation can be across any locations within the TDM signal and wherein a size of the concatenation can be in increments of single TDM frames.

2. The method of claim 1, wherein switching the data through the first switch fabric further comprises mapping TDM traffic into packet data.

3. A method comprising:
    receiving data from a first Time Division Multiplexing (TDM) signal through a number of first interfaces;
    switching the data through a packet mesh upon determining that the data is being processed as packets to be transmitted via one or more second protocols other than a TDM signal, wherein switching the data through the packet mesh includes:
        de-encapsulating a first number of protocol headers associated with the TDM signal from the packets; and
        encapsulating the packets with a second number of protocol headers associated with the second protocols;
    switching the data through a TDM switch fabric different than the packet mesh upon determining that the data is being processed as Time Division Multiplexing (TDM) traffic; and
    transmitting the packets and the TDM traffic into a second TDM signal through a number of second interfaces, wherein the transmitting includes concatenating the packets into the second TDM signal such that the concatenation can be across any location within the second TDM signal and wherein a size of the concatenation can be in increments of single TDM frames.

4. The method of claim 3, wherein the second TDM signal is transmitted to an in-ring network element.

5. The method of claim 3, wherein the packets are concatenated within locations in the second TDM signal not occupied by TDM traffic.

6. A network element comprising:
    a first line card having a number of first interfaces to receive data;
    a second line card having a number of second interfaces;
    a first switch fabric coupling the first line card to the second line card;
    a control card;
    a second switch fabric coupling the control card to the first line card and the second line card,
    wherein the first line card is to switch the data through the first switch fabric upon determining that the data is being processed as packets, wherein the first line card is to switch the data through the second switch fabric upon determining that the data is being processed as Time Division Multiplexing (TBM) traffic, and
    wherein the second line card includes physical connection circuitry, the physical connection circuitry to concatenate the packet data into a TDM signal upon determining that the packet data is transmitted to an in-ring network element, wherein the concatenation can be across any locations, within the TDM signal and wherein a size of the concatenation can be in increments of single TDM frames.

7. A network element comprising:
    a first line card having a number of first interfaces to receive data, the first line card including:
        a first physical connection circuitry coupled to the number of first interfaces;
        a first ingress packet processing circuitry coupled to the first physical connection circuitry; and
        a first egress packet processing circuitry coupled to the first physical connection circuitry and the first ingress packet processing circuitry;
    a second line card having a number of second interfaces, the second line card including:
        a second physical connection circuitry coupled to the number of second interfaces;
        a second ingress packet processing circuitry coupled to the second physical connection circuitry; and
        a second egress packet processing circuitry coupled to the second physical connection circuitry and the second ingress packet processing circuitry,
    a packet mesh coupling the first ingress packet processing circuitry to the second egress packet processing circuitry;
    a control card including a Time Division Multiplexing (TDM) switching circuitry,
    a TDM switch fabric coupling the TDM switching circuitry to the first physical connection circuitry and the second physical connection circuitry, the first physical connection circuitry to switch the data through the packet mesh upon determining that the data is being processed as packets, the first physical connection circuitry to switch the data through the TDM switch fabric upon determining that the data is being processed as Time Division Multiplexing (TDM) traffic.

8. The network element of claim 7, wherein configuration data received from the control card determines whether the first ingress packet processing circuitry or the second egress packet processing circuitry de-encapsulates a first number of protocol headers from the packets, the first number of protocol headers associated with one or more first protocols through which the packets are received and encapsulates the packets with a second number of protocol headers associated with one or more second protocols through which the packets are to be transmitted.

9. The network element of claim 8, wherein the first ingress packet processing circuitry and the second ingress packet processing circuitry is to encapsulate the first number of protocol headers and encapsulate the second number of protocol headers based a field within the first number of protocol headers and the second number of protocol headers.

10. The network element of claim 7, wherein the second physical connection circuitry is to concatenate the packets into a TDM signal upon determining that the packets is transmitted to an in-ring network element, wherein the concatenation can be across any locations within the TDM signal and wherein a size of the concatenation can be in increments of single TDM frames.

11. A machine-readable medium that provides instructions, which when executed by a machine, cause said machine to perform operations comprising:
  receiving data from a number of interfaces via one or more first protocols;
  switching the data through a first switch fabric upon determining that the data is being processed as packet data to be transmitted via one or more second protocols, wherein switching the data through the first switch fabric includes:
    de-encapsulating a first number of protocol headers associated with the first protocols from the packet data; and
    encapsulating the packet data with a second number of protocol headers associated with the second protocols;
  switching the data trough a second switch fabric different than the first switch fabric upon determining that the data is being processed as Time Division Multiplexing (TDM) traffic; and
  concatenating the packet data into a TDM signal, wherein the concatenation can be across any locations within the TDM signal and wherein a size of the concatenation can be in increments of single TDM frames.

12. The machine-readable medium of claim 11, wherein switching the data through the first switch fabric further comprises mapping TDM traffic into packet data.

13. A machine-readable medium that provides instructions, which when executed by a machine, cause said machine to perform operations comprising:
  receiving data from a first Time Division Multiplexing (TDM) signal through a number of first interfaces;
  switching the data through a packet mesh upon determining that the data is being processed as packets to be transmitted via one or more second protocols, wherein switching the data through the packet mesh includes:
    de-encapsulating a first number of protocol headers associated with the TDM signal from the packets; and
    encapsulating the packets with a second number of protocol headers associated with the second protocols;
  switching the data through a TDM switch fabric different than the packet mesh upon determining that the data is being processed as Time Division Multiplexing (TDM) traffic; and
  transmitting the packets and the TDM traffic into a second TDM signal through a number of second interfaces, wherein the transmitting includes concatenating the packets into the second TDM signal such that the concatenation can be across any location within the second TDM signal and wherein a size of the concatenation can be in increments of single TDM frames.

14. The machine-readable medium of claim 13, wherein the second TDM signal is transmitted to an in-ring network element.

15. The machine-readable medium of claim 13, wherein the packets are concatenated within locations in the second TDM signal not occupied by TDM traffic.

* * * * *